US00RE50036E

(19) United States
(12) Reissued Patent
Aichriedler et al.

(10) Patent Number: US RE50,036 E
(45) Date of Reissued Patent: Jul. 9, 2024

(54) SYNCHRONIZATION MECHANISM FOR HIGH SPEED SENSOR INTERFACE

(71) Applicant: Infineon Technologies AG, Neubiberg (DE)

(72) Inventors: Leo Aichriedler, Puch (AT); Christof Michenthaler, Neubiberg (DE)

(73) Assignee: Infineon Technologies AG, Neubiberg (DE)

(21) Appl. No.: 17/303,315

(22) Filed: May 26, 2021

Related U.S. Patent Documents

Reissue of:
(64) Patent No.: 10,581,543
Issued: Mar. 3, 2020
Appl. No.: 15/870,543
Filed: Jan. 12, 2018

U.S. Applications:
(63) Continuation-in-part of application No. 15/692,974, filed on Aug. 31, 2017, now Pat. No. 10,348,430.
(Continued)

(51) Int. Cl.
*H04J 3/06* (2006.01)
*H04L 7/08* (2006.01)
(Continued)

(52) U.S. Cl.
CPC ..... *H04J 3/0635* (2013.01); *H04J 3/0652* (2013.01); *H04L 12/40* (2013.01); *H04Q 9/04* (2013.01);
(Continued)

(58) Field of Classification Search
CPC ..... H04J 3/0635; H04J 3/0638; H04J 3/0652; H04J 3/0682; H04L 12/40;
(Continued)

(56) References Cited

U.S. PATENT DOCUMENTS 7,487,022 B2 2/2009 Glaser
7,583,560 B2 9/2009 Chamberlain et al.
(Continued)

FOREIGN PATENT DOCUMENTS

CN 101383693 A 3/2009
CN 102047594 A 5/2011
(Continued)

OTHER PUBLICATIONS

Kaufman, "Interconnecting Smart Objects", 2010, chpater 19, pp. 295-301, retrieved from https://www.sciencedirect.com/science/article/pii/B9780123751652000193. (Year: 2010).*
(Continued)

*Primary Examiner* — Eron J Sorrell
(74) *Attorney, Agent, or Firm* — Harrity & Harrity, LLP

(57) ABSTRACT

A sensor may determine, based on two or more synchronization signals provided by a control device, an expected time for receiving an upcoming synchronization signal. The sensor may perform a measurement of a sensor signal at a point in time such that sensor data, corresponding to the measurement of the sensor signal at the point in time, is available at a selectable time interval prior to reception of the upcoming synchronization signal.

38 Claims, 12 Drawing Sheets

Related U.S. Application Data

(60) Provisional application No. 62/444,687, filed on Jan. 10, 2017.

(51) Int. Cl.
*H04L 12/40* (2006.01)
*H04Q 9/04* (2006.01)
*H04W 56/00* (2009.01)

(52) U.S. Cl.
CPC ..... *H04W 56/001* (2013.01); *H04J 3/0682* (2013.01); *H04L 7/08* (2013.01)

(58) Field of Classification Search
CPC ..... H04L 2012/40273; H04L 7/08; H04Q 2209/30; H04Q 2209/845; H04Q 9/04; H04W 56/001
See application file for complete search history.

(56) References Cited

U.S. PATENT DOCUMENTS

| | | | | |
|---|---|---|---|---|
| 8,654,988 | B2 | 2/2014 | Jia et al. | |
| 8,948,280 | B2 * | 2/2015 | Hammerschmidt | H04L 7/10 375/260 |
| 10,053,141 | B2 | 8/2018 | Suzuki et al. | |
| 2002/0103592 | A1 | 8/2002 | Gross et al. | |
| 2003/0190002 | A1 * | 10/2003 | Azakami | H04H 40/18 375/368 |
| 2006/0132189 | A1 | 6/2006 | Holt et al. | |
| 2007/0110106 | A1 * | 5/2007 | Becker | H04B 7/2681 370/503 |
| 2009/0190571 | A1 * | 7/2009 | Kitz | H04J 3/0664 370/350 |
| 2011/0134906 | A1 | 6/2011 | Garudadri et al. | |
| 2012/0268106 | A1 | 10/2012 | Blake, Jr. et al. | |
| 2012/0271570 | A1 | 10/2012 | Paik et al. | |
| 2012/0271579 | A1 | 10/2012 | Deokar et al. | |
| 2015/0236869 | A1 | 8/2015 | Vreeland et al. | |
| 2015/0351057 | A1 | 12/2015 | Akita et al. | |
| 2016/0190863 | A1 * | 6/2016 | Ogasawara | G04G 19/00 368/47 |
| 2016/0352388 | A1 | 12/2016 | Lane | |
| 2016/0378153 | A1 * | 12/2016 | Kelly | G06F 13/4022 713/300 |
| 2017/0041897 | A1 * | 2/2017 | Pitigoi-Aron | H04J 3/0685 |
| 2018/0041198 | A1 | 2/2018 | Kelly et al. | |
| 2018/0198546 | A1 | 7/2018 | Aichriedler et al. | |

FOREIGN PATENT DOCUMENTS

| | | | | |
|---|---|---|---|---|
| CN | 102640437 | A | 8/2012 | |
| CN | 106254057 | A | 12/2016 | |
| CN | 108289003 | A | 7/2018 | |
| GB | 2452951 | A * | 3/2009 | H04Q 9/00 |
| KR | 101068003 | B1 | 9/2011 | |
| KR | 101619628 | B1 | 5/2016 | |
| WO | WO-2005060423 | A2 * | 7/2005 | H04W 52/0216 |

OTHER PUBLICATIONS

"Ethernet Frame", Jan. 3, 2017, Wikipedia, pp. 1-8, retreived from https://en.wikipedia.org/w/index.php?title=Ethernet_frame&oldid=758146130, (Year: 2017).*

* cited by examiner

900

950

SYNCHRONIZATION MECHANISM FOR HIGH SPEED SENSOR INTERFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This application is a Continuation-In-Part (CIP) of U.S. patent application Ser. No. 15/692,974, filed on Aug. 31, 2017, which claims priority under 35 U.S.C. § 119 to U.S. Provisional Patent Application No. 62/444,687, filed on Jan. 10, 2017, the contents of which are incorporated by reference herein in their entirety.

BACKGROUND

A sensor (e.g., a speed sensor, a position sensor, an angle sensor, a temperature sensor, a current sensor, and/or the like) may be used to provide feedback information in a mechatronic system by, for example, operating as an interface between the mechanical domain and the electrical domain. In some cases, a physical position of the sensor is dependent on mechanical constraints of the mechatronic system, such as available physical space, accessibility to a sensing target (e.g., a target wheel, a shaft end, and/or the like). Thus, in some applications, the sensor cannot be integrated with an electronic control unit (ECU) and must operate as a standalone (i.e., remote) sensor that is connected to the ECU via a wired interface.

SUMMARY

According to some possible implementations, a sensor may include one or more components to determine a sampling pattern based on a group of synchronization signals received by the sensor, wherein the sampling pattern may identify an expected time for receiving an upcoming synchronization signal; and trigger, based on the sampling pattern, a performance of a sensor operation associated with the upcoming synchronization signal, wherein the performance of the sensor operation may be triggered before the upcoming synchronization signal is received.

According to some possible implementations, a system may include a sensor to determine a sampling pattern based on a group of synchronization signals received by the sensor, wherein the sampling pattern may identify a time at which an upcoming synchronization signal is expected to be received by the sensor; and perform, based on the sampling pattern, a sensor operation associated with the upcoming synchronization signal, wherein the sensor operation may be performed such that sensor data, associated with the sensor operation, is ready to be transmitted by the time at which the upcoming synchronization signal is expected to be received.

According to some possible implementations, a method may include determining a sampling pattern based on receiving a group of synchronization signals, wherein the sampling pattern may identify an expected time for receiving an upcoming synchronization signal; and triggering and based on the sampling pattern, a performance of a sensor operation associated with the upcoming synchronization signal, wherein the performance of the sensor operation may be triggered before the upcoming synchronization signal is received by a sensor.

According to some possible implementations, a system may include a sensor to: determine, based on two or more synchronization signals provided by a control device, an expected time for receiving an upcoming synchronization signal; and perform a measurement of a sensor signal at a point in time such that sensor data, corresponding to the measurement of the sensor signal at the point in time, is available at a selectable time interval prior to reception of the upcoming synchronization signal.

According to some possible implementations, a sensor may include one or more components to: determine an expected time for receiving an upcoming synchronization signal, wherein the expected time may be determined based on a group of synchronization signals provided by a control device associated with the sensor; sample a sensor signal at a point in time such that sensor data, calculated based on sampling the sensor signal at the point in time, is available at a selectable time interval prior to the sensor receiving the upcoming synchronization signal; calculate the sensor data based on sampling the sensor signal at the point in time; and provide the sensor data after receiving the upcoming synchronization signal.

According to some possible implementations, a control device may include one or more components to: provide a group of synchronization signals to a set of sensors, wherein the group of synchronization signals may define a sampling pattern for identifying an expected time associated with another synchronization signal; provide the other synchronization signal; and receive sensor data from a sensor, of the set of sensors, after providing the other synchronization signal, wherein, based on the sampling pattern, the sensor data is available at the sensor before the other synchronization signal is received by the sensor.

DETAILED DESCRIPTION

Figure 1A:
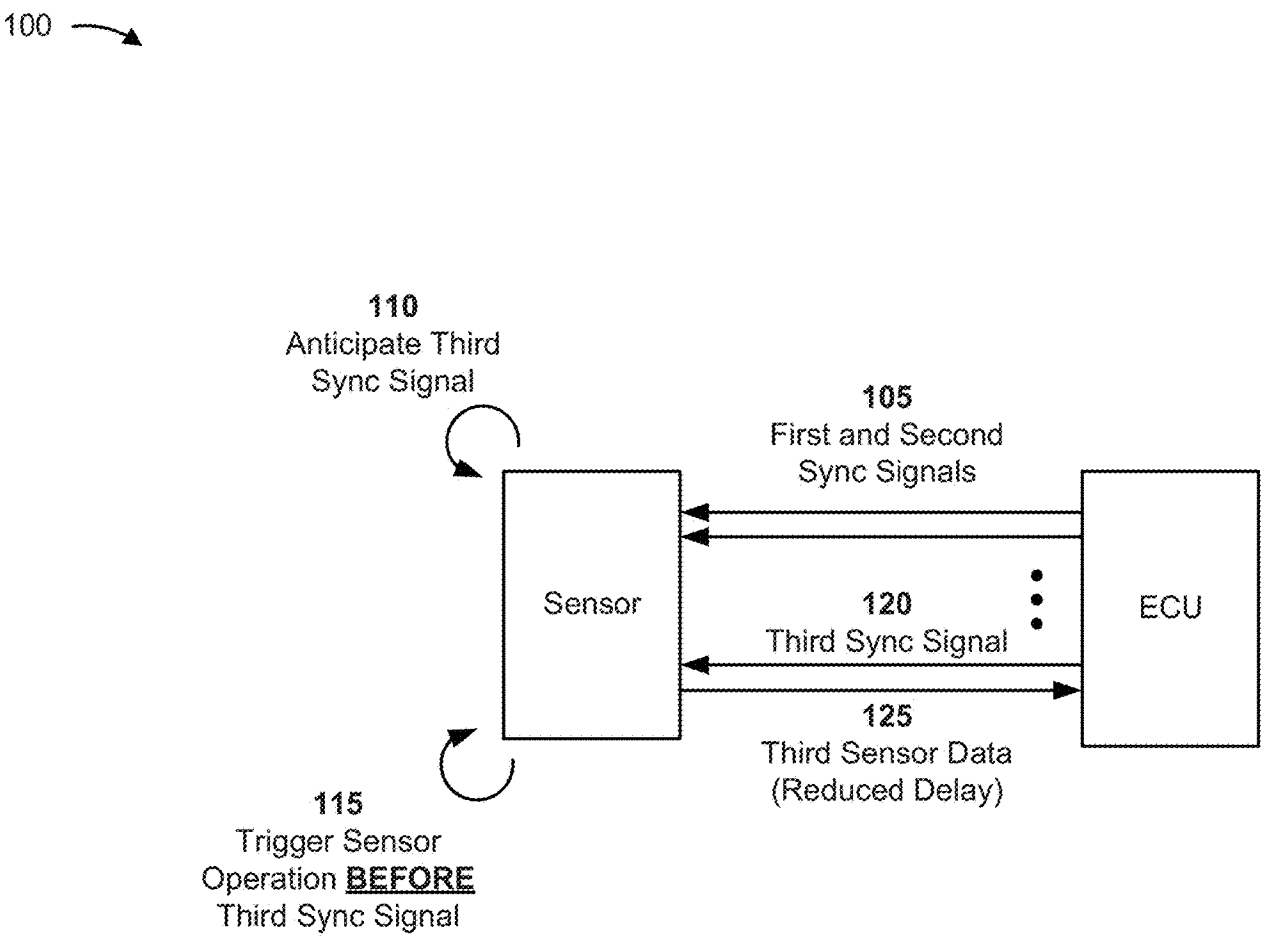
FIGS. 1A and 1B are diagrams of an overview of an example implementation described herein.

The following detailed description of example implementations refers to the accompanying drawings. The same reference numbers in different drawings may identify the same or similar elements.

An interface between a sensor and an ECU (e.g., a wired interface between a remote sensor and an ECU) is an important component in a sensor system. For example, the interface may significantly impact robustness of the sensor system since the interface contributes significantly to an overall failure-in-time (FIT) rate of the sensor system, and may significantly impact the cost of the sensor system by adding to a cost to produce, assemble, and/or maintain the sensor system. As another example, the interface may significantly impact performance of the sensor system since the interface can act as a bottleneck for the transfer of information in the sensor system.

With regard to the impact on performance, in some cases, the performance of the sensor system may be limited by a connection bandwidth (e.g., an available gross baud rate) and/or synchronization losses between the sensor and the ECU. The connection bandwidth issue may be resolved by introducing advanced connection schemes, in some cases. However, the synchronization losses between the sensor and the ECU remain a major limitation in terms of achievable performance of the sensor system.

In general, transfer of information between a sensor and an ECU can be handled by configuring the sensor to automatically provide (e.g., without a request from the ECU) a stream of sensor data (herein referred to as a continuous data stream), or by configuring the sensor to provide sensor data based on receiving a request from the ECU.

In the case of a continuous data stream, both a sampling time (e.g., a time when the sensor samples or measures a sensor signal) and a time at which a transmission of sensor data is initiated are determined by a clock of the sensor, which operates in a sensor clock domain. Here, the ECU needs to receive the sensor data in real-time even though the ECU may not need the sensor data until a later point in time (e.g., a later time at which ECU is to perform a computing operation using the sensor data). Therefore, the ECU must perform an operation to synchronize the sensor data with a clock of the ECU 210, which operates in an ECU clock domain that differs from the sensor clock domain.

Using such a scheme, there is a variable delay between the sensor sampling the sensor signal and use of the sensor data by the ECU. Contributors to this latency time include an amount of time needed for the sensor to perform a data calculation after sampling the sensor signal, an amount of time needed for the sensor to transmit the sensor data after performing the data calculation, and an amount of "waiting" time between completion of the transmission of the sensor data and use of the sensor data by the ECU.

Due to the asynchronous operation of the sensor and the ECU (e.g., due to operation in different clock domains), the latency time can vary between one and two times a sum of the amount of time needed for the sensor to perform the data calculation and the amount of time needed to transmit the sensor data (herein referred to as the sensor time). In a case where a sensor update rate (e.g., a rate at which a transmission of sensor data is provided by the sensor) is higher than an ECU cycle time (e.g., an amount of time needed for the ECU to perform one computing cycle), the waiting time may vary between zero (e.g., when transmission of the sensor data is completed exactly at the point in time at which the sensor data is to be used by the ECU) and an amount of time equal to the sensor time. If the sensor time is an integer multiple of the ECU cycle time, then the waiting time may theoretically remain constant. However, due to tolerances of the sensor and the ECU clock domains, the integer multiple will not be constant and, thus, the waiting time will change each cycle, thereby introducing variation in the latency time.

In some cases, the latency time could be reduced by increasing a speed of the sensor (e.g., in order to reduce an amount of time to perform data calculation) and/or increasing a bandwidth of the interface (e.g., in order to reduce an amount of time to transmit the sensor data). Here, if dynamics of the sensor system are known, then a deviation in the sensor time, caused by different operating conditions, may be compensated by implementing an estimation algorithm in the ECU. However, the variable portion of the latency time (i.e., the waiting time) cannot be compensated in this manner. As a result, the continuous data stream technique for transfer of information between the sensor and the ECU may introduce an undesirably high and/or variable amount of synchronization error at the ECU (e.g., between approximately 0 degrees and 2.55 degrees for an angle sensor).

Configuring the sensor to provide sensor data based on receiving a request from the ECU (i.e., rather than a continuous data stream) may reduce or eliminate synchronization error caused by the clock domains of the sensor and the ECU. For example, using a conventional technique for such a synchronization scheme, the ECU may provide a synchronization signal to the sensor. Here, receipt of the synchronization signal by the sensor causes the sensor to sample (i.e., measure) a sensor signal, perform data calculation, and then transmit the sensor data to the ECU. In this case, there is no synchronization error in sensor data decoded by the ECU (e.g., since the sensor is synchronized with the ECU based on the synchronization signal provided by the ECU). However, this conventional technique has a number of drawbacks.

One drawback of the conventional technique is that a utilization rate of a sensor interface bus is relatively low since there is no communication on the bus during a time period when the sensor is sampling the sensor signal and performing the data calculation. This also leads to a reduction in a maximum possible update rate for a given interface bandwidth.

Similarly, another drawback of the conventional technique is that, since the ECU needs to access the sensor interface bus two times every update cycle (e.g., once in order to provide the synchronization signal and then again in order to receive the sensor data), the utilization rate of the sensor interface bus may be reduced since the sensor interface bus must be available for a transmission by the sensor at an expected point in time (e.g., a time at which transmission of the sensor data is expected).

Another drawback of the conventional technique is that the ECU provides the synchronization signal well before the sensor data is transmitted by the sensor. In some cases, such a delay introduces the potential errors in the sensor system.

Still another drawback of the conventional technique is that the ECU needs to switch between performing two different operations: a first operation associated with providing the synchronization signal and a second operation associated with receiving and processing the sensor data. In some cases, interruption of one operation (e.g., the second operation) to switch to another operation (e.g., the first operation) may require consumption of computing power by the ECU and, thus, should be avoided when possible.

Another drawback of the conventional technique is a limitation on an achievable sensor update rate. For example, in some sensor systems (e.g., a rotor position sensor for a drive application), a relatively high sensor update rate (e.g., one complete transmission of sensor data every 33 microseconds (μs)) may be required. Here, the sensor update rate is impacted by an amount of delay associated with receiving the synchronization signal, an amount of time to sample the sensor signal, an amount of time to perform the calculation, and an amount of time to transmit the sensor data. In a typical sensor that uses the conventional synchronization technique described above, the update rate may be, for example, one complete transmission approximately every 45 μs (or worse). Thus, a relatively high sensor update rate may not be achievable using the conventional synchronization technique.

In order to enable an improved (i.e., as compared to the conventional technique) sensor update rate, either an amount of time needed to transmit the sensor data or an amount of time need to sample the sensor signal and perform the calculation could be reduced. However, due to limitations on the bandwidth of the sensor interface, increasing the transmission speed may not be possible, or would come at an unreasonable high cost (e.g., changing of a physical layer). Similarly, while a reduction of a sampling time and/or a calculation time may be achieved with faster signal processing, increasing the speed of signal processing may also come at unreasonably high cost (e.g., implementing advanced processing, implementing parallel processing, and/or the like).

Notably, while a number of techniques exist for governing transfer of sensor data (e.g., incremental interface (IIF), serial peripheral interface (SPI), single edge nibble transmission (SENT), short pulse width modulation code (SPC), pulse width modulation (PWM), analog, and/or the like), these techniques are not capable of providing acceptable interface bandwidths and/or immunity to an electromagnetic environment (EME) that is needed in order to be used by a remote sensor requiring a relatively high update rate (e.g., 33 μs or better).

In some cases, an analog interface is used when a relatively high update rate is needed. However, although the analog interface may provide an acceptable update rate, the analog interface has a number of drawbacks. For example, the analog interface may require additional wires in order to facilitate data transfer (e.g., additional cost and/or complexity as compared to a digital interface), may be susceptible to electromagnetic distortions, and/or may not be compatible with a particular data processing technique (e.g., a digital processing technique) used in the sensor system. Further, the analog interface may not be capable of transferring other information associated with the sensor. For example, the analog interface may not be capable of transferring diagnostic information associated with the sensor, such as information associated with a self-diagnosis, temperature information, information associated with a checking a range of sensor input data (e.g., a magnetic field strength), and/or the like.

Some implementations described herein provide techniques for synchronization of a sensor (e.g., a remote sensor) with an ECU, via a digital interface, while achieving an improved sensor update rate (e.g., as compared to the conventional synchronization technique described above). In some implementations, such improved synchronization may be achieved by configuring the sensor based on a self-adjusting trigger technique used to anticipate an upcoming synchronization signal, as described in further detail below.

Further, some implementations described herein provide techniques for synchronization of multiple sensors (e.g., multiple remote sensors) with an ECU, where each of the multiple sensors synchronously sample their respective sensor signals (e.g., such that each of the multiple sensors sample their respective sensor signals at the same time). In some implementations, the multiple sensors can be caused to operate in such a synchronous mode based on a broadcast synchronization feature configured in the sensor system, as described in further detail below.

Figure 1B:
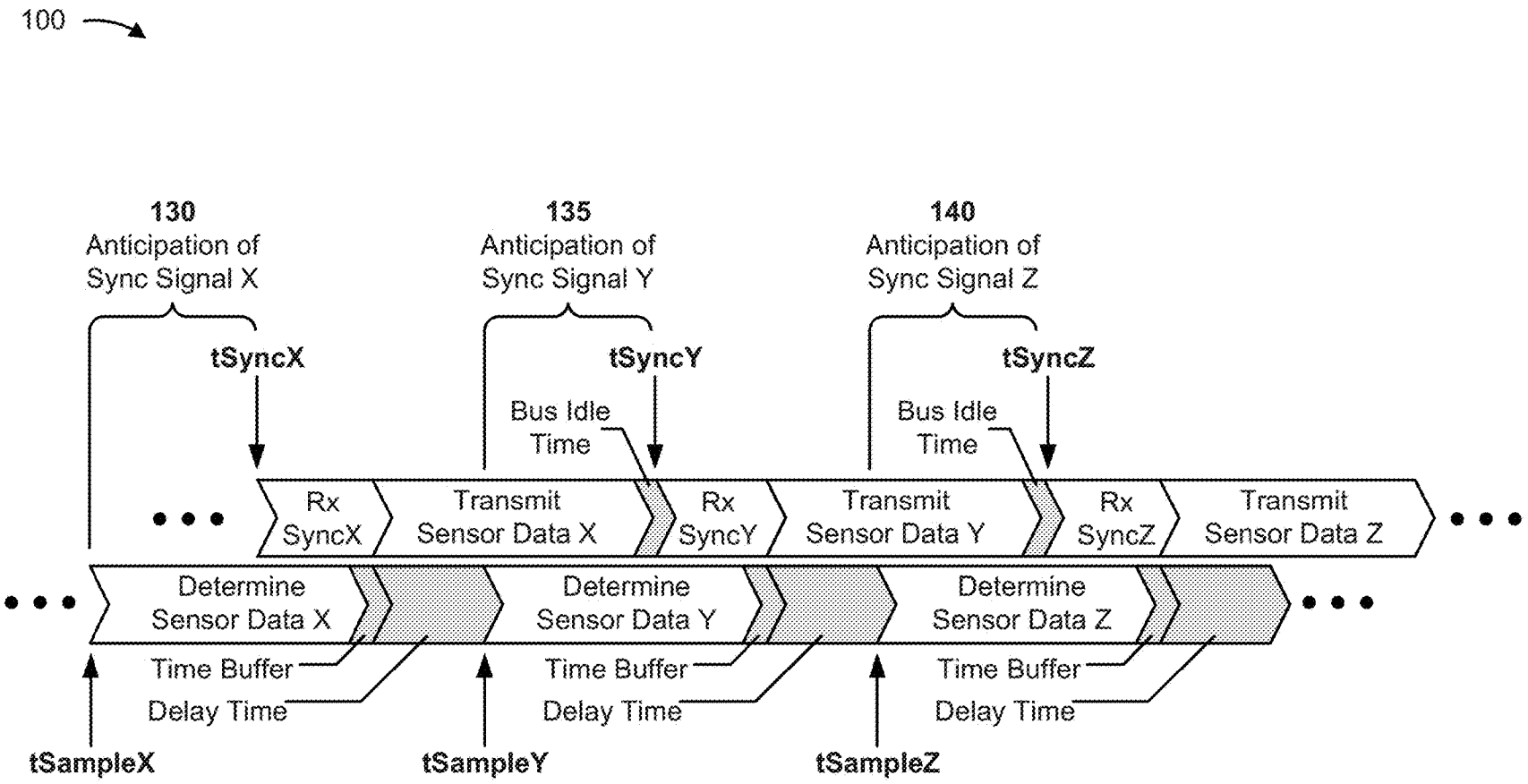

FIGS. 1A and 1B are diagrams of an overview of an example implementation 100 described herein. As shown in FIG. 1A, a sensor is connected to an ECU via a sensor interface bus (e.g., such that the sensor may provide sensor data to the ECU via the sensor interface bus). In example implementation 100, in order to synchronize the sensor with the ECU, the sensor is configured to anticipate synchronization (sync) signals (before such signals are provided by the ECU) in order to permit an improved sensor update rate while achieving synchronization via a digital interface, as described below.

As shown by reference number 105, the ECU provides (e.g., when the sensor system powers on) a group of sync signals (e.g., including a first sync signal and a second sync signal) to the sensor. For example, as shown, the ECU may provide a first sync signal that is received by the sensor at a first time. Here, the sensor may perform a sensor operation (e.g., sampling a sensor signal, calculating sensor data, etc.) and may transmit first sensor data to the ECU (not shown in FIG. 1A). The ECU may then transmit the second sync signal that is received by the sensor at a second (e.g., later) time. Once again the sensor may perform a sensor operation and may transmit second sensor data to the ECU (not shown in FIG. 1A).

As shown by reference number 110, the sensor may anticipate a third (e.g., an upcoming) sync signal based receiving the first sync signal and the second sync signal. For example, in some implementations, the sensor may determine, based on the first and second sync signals, a sampling pattern associated with sync signals received from the ECU. The sampling pattern may identify, for example, an expected amount of time between receipt of a given pair of sync signals from the ECU. Here, based on the sampling pattern with the sync signals received from the ECU, the sensor may anticipate the third sync signal. For example, the sensor may identify, based on the sampling pattern, a time point at which the sensor expects to receive the third sync signal from the ECU.

As shown by reference number 115, the sensor may trigger a sensor operation, associated with the third sync signal, based on anticipating the third sync signal. In other words, the sensor may begin performing the sensor operation before the sensor receives the third sync signal from the ECU.

In some implementations, the sensor may trigger the sensor operation based on the time point at which the sensor expects to receive the third sync signal. For example, the sensor may store, have access to, or otherwise determine an amount of time needed for the sensor to perform the sensor operation (e.g., an amount of time needed to sample a sensor signal and calculate sensor data). Here, since the sensor has identified when the third sync signal is expected, the sensor may determine a time point at which to trigger the sensor operation, associated with the third sync signal, such that third sensor data is ready for transmission at or near the time point at which the third sync signal is received. Thus, the sensor may trigger the sensor operation, associated with the third sync signal, before receiving the third sync signal from the ECU. A detailed example of such a technique is described below with regard to FIG. 1B.

As shown by reference number 120, the sensor receives the third sync signal from the ECU. Here, since the sensor has triggered the sensor operation, associated with the third sync signal, before receiving the third sync signal, the third sensor data may be ready for transmission at or near the time at which the third sync signal is received. Thus, as shown by reference number 125, the sensor may provide the third sensor data with a reduced delay (i.e., almost immediately after receiving the third sync signal).

FIG. 1B is a diagram further illustrating the example technique described in FIG. 1A. For the purposes of FIG. 1B, the sensor has determined a sampling pattern associated with receiving sync signals from the ECU (e.g., an expected amount of time between receiving a given sync signal and receiving a next sync signal).

As shown by reference number 130, the sensor may anticipate, based on the sampling pattern, receipt of sync signal X and trigger performance of a sensor operation, associated with sync signal X, accordingly. For example, based on the sampling pattern, the sensor may determine that, in order have sensor data X ready for transmission at or near a time point at which the sensor receives sync signal X, the sensor is to trigger performance of a sensor operations (e.g., determination of sensor data X) at time tSampleX. Notably, time tSampleX is before a time tSyncX at which the ECU transmits sync signal X and, thus, is before a time at which the sensor receives sync signal X. As shown, sensor data X is ready for transmission when the sensor receives sync signal X via the sensor interface bus (e.g., after Rx SyncX), and the sensor transmits sensor data X (e.g., immediately after receiving sync signal X). As shown, in some implementations, the sensor may be configured to implement a time buffer in order to, for example, ensure that sensor data X is ready for transmission before sync signal X is received.

As shown by reference number 135, the sensor may, based on the sampling pattern, anticipate receipt of sync signal Y (i.e., a next sync signal) and trigger performance of a sensor operation, associated with sync signal Y, accordingly. As shown, based on the sampling pattern, the sensor may delay triggering performance of the sensor operation until time tSampleY in order to have sensor data Y ready for transmission at or near a time point at which the sensor receives sync signal Y (e.g., after transmission by the ECU at time tSyncY). In this way, an amount of latency between sampling of the sensor signal and transmission of corresponding sensor data is reduced. Further, as shown, a period of time during which the sensor determines sensor data Y overlaps with a period of time during which the sensor transmits sensor data X. In other words, "next" sensor data may be determined while "current" sensor data is being transmitted, which allows for an improved sensor update rate, as described below.

The sensor may proceed in the manner described above for transmission of sensor data Y and, as shown by reference number 140, may proceed in a similar manner for anticipation of sync signal Z and transmission of sensor data Z associated with sync signal Z. Additional details regarding the above described processes are described below.

In this way, a sensor may be synchronized with an ECU, via a digital interface, while achieving an improved sensor update rate (e.g., as compared to the conventional synchronization technique described above).

In some implementations, a utilization rate of a sensor interface bus is increased since delay between use of the sensor interface bus for transmission of a sync signal and transmission of corresponding sensor data is reduced or eliminated. Further, since a time point at which the sensor interface bus should be available for a transmission by the sensor closely or immediately follows the transmission of the sync signal, the sensor interface bus is utilized more efficiently.

Additionally, an amount of time between transmission of the sync signal and a transmission of corresponding sensor data is reduced, which may reduce the potential for errors in the sensor system.

Furthermore, using the techniques described herein, an achievable sensor update rate is increased. For example, by anticipating a sync signal and triggering performance of a sensor operation in the manner described above, a significant amount of delay associated with a given sensor cycle is eliminated. As such, the rate at which the sensor completes cycles of determining and transmitting sensor data is improved, thereby facilitating a relatively high sensor update rate (e.g., one complete transmission every 33 μs or better).

As indicated above, FIGS. 1A and 1B are provided merely as an example. Other examples are possible and may differ from what was described with regard to FIGS. 1A and 1B.

Figure 2:
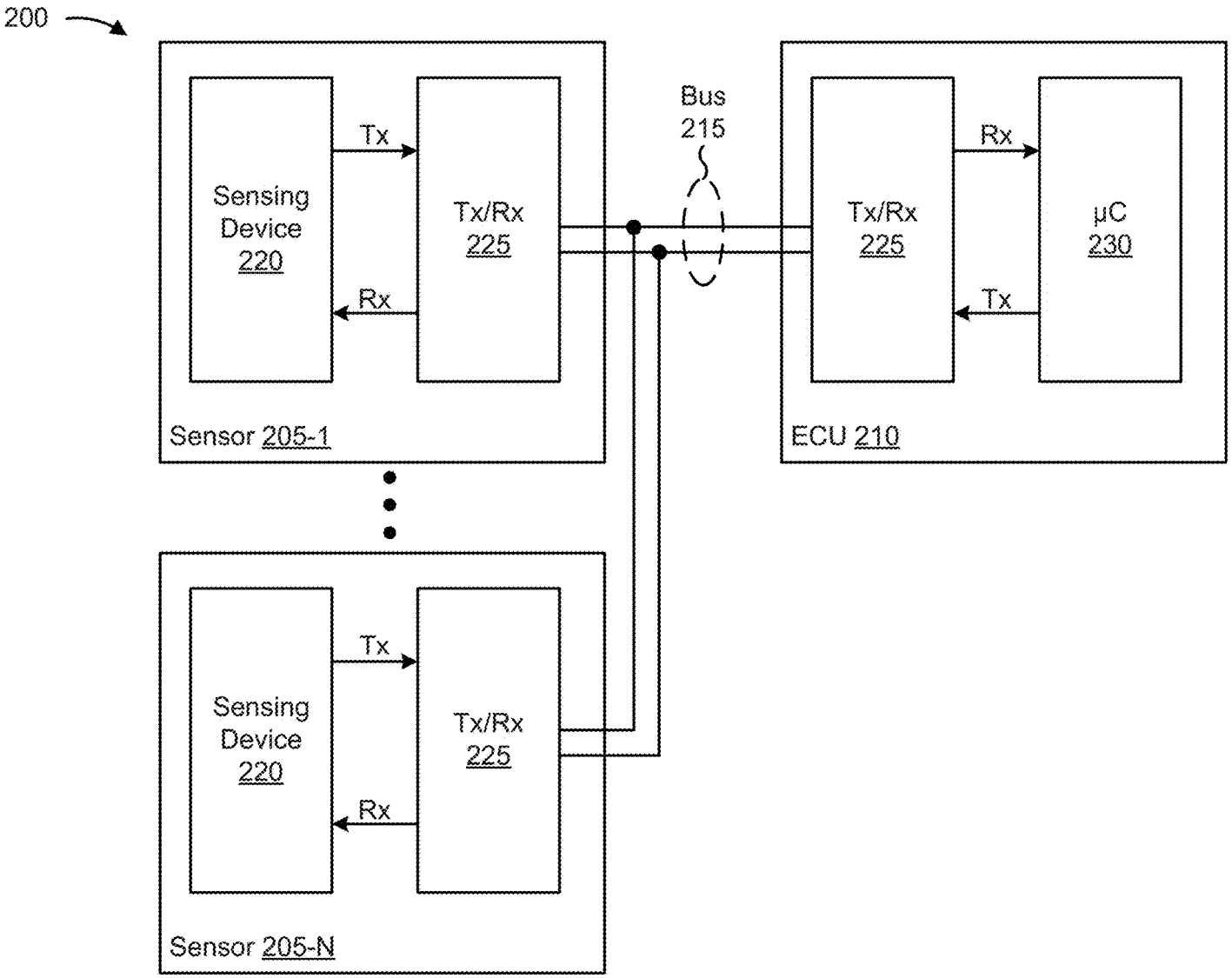
FIG. 2 is a diagram of an example environment in which systems and/or methods, described herein, may be implemented.

FIG. 2 is a diagram of an example environment 200 in which techniques and apparatuses described herein may be implemented. As shown in FIG. 2, environment 200 may a set of sensors 205-1 through 205-N(N≥1) (herein referred to collectively as sensors 205, and individually as sensor 205) connected to an ECU 210 via a sensor interface bus 215 (herein referred to as bus 215).

Sensor 205 includes a housing associated with one or more components of a sensor for measuring one or more characteristics (e.g., a speed of an object, a position of an object, an angle of rotation of an object, an amount of pressure, a temperature, an amount of current, and/or the like). As shown, sensor 205 includes a sensing device 220 and a transceiver (Tx/Rx) 225. In some implementations, sensor 205 may include two or more sensing devices 220 and a Tx/Rx 225 (i.e., sensor 205 may include a sensor cluster). In some implementations, sensor 205 is remote from ECU 210 and, thus, is connected to ECU 210 via bus 215 (e.g., via a wired connection). Additionally, or alternatively, sensor 205 may be a local sensor (e.g., such that sensor 205 is connected to ECU 210 210 via a short connection, is integrated with ECU 210 on a same chip, and/or the like).

Sensing device 220 includes a device capable of performing a sensing function (e.g., sampling a sensor signal, calculating and/or determining sensor data, and/or the like). In some implementations, sensing device 220 is capable of perform operations associated with anticipating a sync signal, to be provided by ECU 210, and triggering the sensing function based on the anticipated sync signal, as described herein. In some implementations, sensing device 220 may include one or more sensing elements, an analog-to-digital converters (ADC), a digital signal processor (DSP), a memory component, and a digital interface that enable performance of the sensing function and/or enable operations associated with anticipating a sync signal by sensing device 220.

Transceiver 225 includes a component via which a device (e.g., sensor 205, ECU 210) may transmit and receive information. For example, transceiver 225 may include a differential line transceiver, or a similar type device. In some implementations, transceiver 225 includes a transmit (Tx) component that allows sensor 205 to transmit information (e.g., sensor data, information that identifies a delay time associated with anticipating a sync signal, and/or the like) to ECU 210 via bus 215, and a receive (Rx) component that allows sensor 205 to receive information (e.g., sync signals) from ECU 210 via bus 215. In some implementations, transceiver 225 may include a line driver for enabling the Tx component (to transmit information) or the Rx component (to receive information) at a given time. In some implementations, sensor 205 may not include transceiver 225. For example, sensor 205 may not include transceiver 225 when sensor 205 is a local sensor and/or when a length of a connection between sensor 205 and ECU 210 is relatively short (e.g., as compared to an application where sensor 205 is a remote sensor).

Bus 215 includes a sensor interface bus for carrying information between sensor 205 and ECU 210. In some implementations, bus 215 may comprise a connection (e.g., including one or more wires and connectors) via which sensor 205 is connected to ECU 210. In some implementations, bus 215 may include a set of connections, each associated with one or more sensors 205 connected to ECU 210 (e.g., when multiple sensors 205 are connected to ECU 210 via one or more busses 215). In some implementations, a given connection may be capable of carrying a signal from ECU 210 to sensor 205 and carrying a signal from sensor 205 to ECU 210 (e.g., via a same wire or via a different wire).

ECU 210 includes one or more devices associated with controlling one or more electrical systems and/or electrical subsystems based on sensor data provided by sensor 205 (e.g., a control device). As shown, ECU 210 may include a transceiver 225 and a controller (μC) 230. In some implementations, controller 230 may be capable of calibrating, controlling, adjusting, or the like, the one or more electrical systems and/or electrical subsystems based on sensor data transmitted by sensor 205. For example, in some implementations, controller 230 may include an electronic/engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), or another electrical system or electrical subsystem of a vehicle. In some implementations, controller 230 may include one or more components associated with transmitting, receiving, generating, providing, and/or storing information (e.g., a sync signal, sensor data, information that identifies a delay time associated with anticipating a sync signal, and/or the like), as described herein. For example, controller 230 may include a universal sensor interface chip (USIC) component, one or more direct memory access (DMA) components, a random access memory (RAM) component, a field-oriented control (FOC) component, a space vector PWM (SVPWM) component, a PWM output component, a general purpose input/output (GPIO) component, a pattern memory component, a pattern generator component, and/or the like.

As described above, transceiver 225 includes a component via which a device (e.g., sensor 205, ECU 210) may transmit and receive information. In some implementations, transceiver 225 includes a Tx component that allows ECU 210 to transmit information (e.g., sync signals) to sensor 205 via bus 215, and a Rx component that allows ECU 210 to receive information (e.g., sensor data, information that identifies a delay time associated with anticipating a sync signal, and/or the like) from sensor 205 via bus 215. In some implementations, transceiver 225 may include a line driver for enabling the Tx component (to transmit information) or the Rx component (to receive information) at a given time.

The number and arrangement of apparatuses shown in FIG. 2 is provided as an example. In practice, there may be additional devices and/or components, fewer devices and/or components, different devices and/or components, or differently arranged devices and/or components than those shown in FIG. 2. For example, in some implementations, environment 200 may include multiple sensors 205, each connected to ECU 210 via one or more associated busses 215. Furthermore, two or more devices and/or components shown in FIG. 2 may be implemented within a single devices and/or components, or a single devices and/or a single component shown in FIG. 2 may be implemented as multiple, distributed devices and/or components. Additionally, or alternatively, a set of devices and/or components (e.g., one or more devices and/or components) of FIG. 2 may perform one or more functions described as being performed by another set of devices and/or components of FIG. 2.

Figure 3:
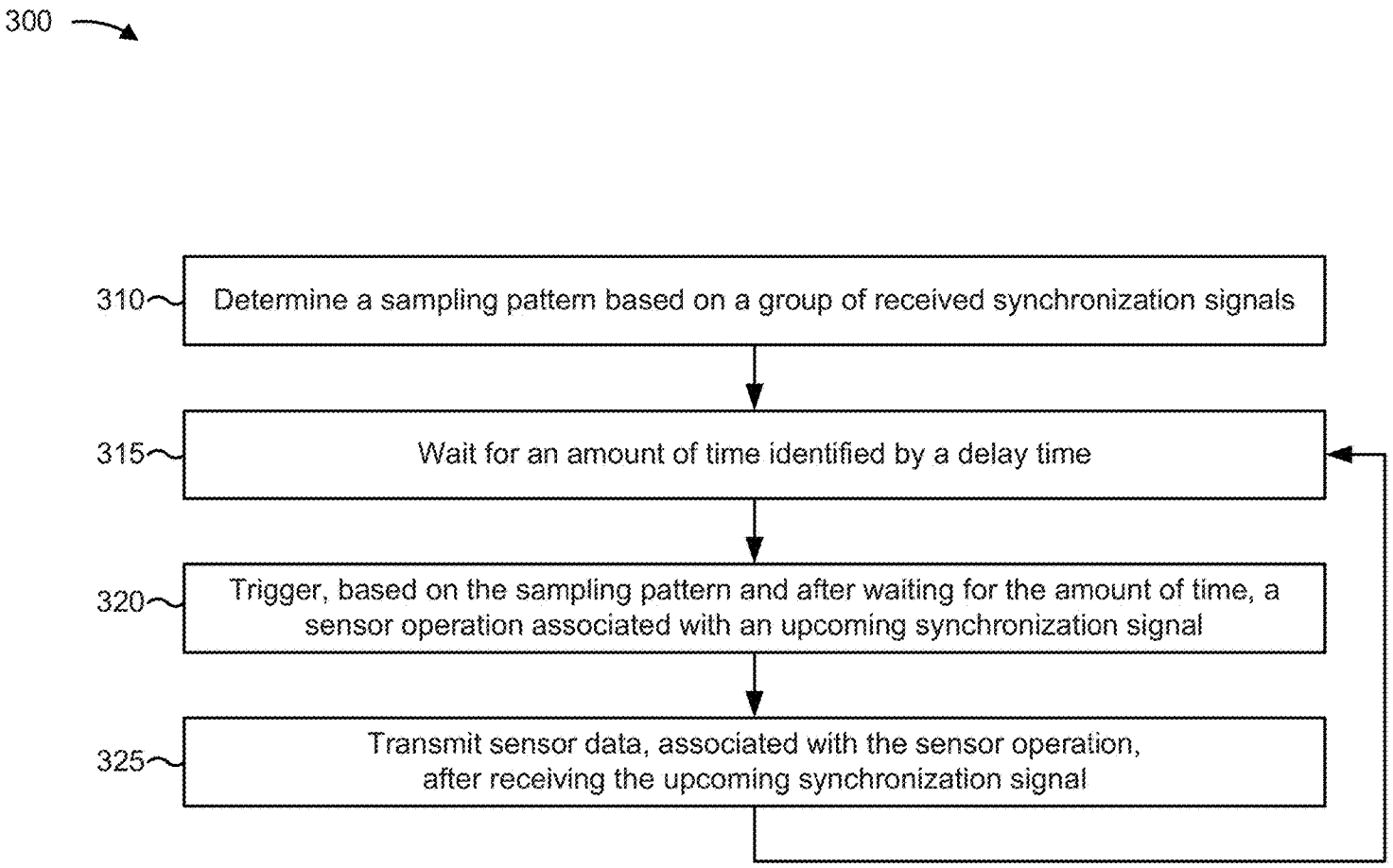
FIG. 3 is a flow chart of an example process for triggering a sensor operation, associated with an upcoming sync signal, based on a sampling pattern associated with receiving sync signals.

FIG. 3 is a flow chart of an example process 300 for triggering a sensor operation, associated with an upcoming sync signal, based on a sampling pattern associated with receiving sync signals. In some implementations, one or more process blocks of FIG. 3 may be performed by sensor 205.

As shown in FIG. 3, process 300 may include determining a sampling pattern based on a group of received synchronization signals (block 310). For example, sensor 205 may determining a sampling pattern based on a group of sync signals received from ECU 210.

The sampling pattern may include a pattern that identifies an expected amount of time between receiving sync signals provided by ECU 210. For example, the sampling pattern may identify an expected amount of time between receiving a given sync signal and a next sync signal (e.g., when sync signals are expected at a regular interval). As another example, the sampling pattern may identify a first expected about of time between receipt of a first sync signal and receipt of a second sync signal, a second expected amount of time between the receipt of the second sync signal and receipt of a third sync signal, and a third expected amount of time between receipt of the third sync signal and receipt of a fourth sync signal (e.g., when sync signals are expected in a repeating sequence of three different intervals). In some implementations, the sampling pattern may define a synchronization period associated with receiving synchronization signals (e.g., an length of time between receiving of a given pair of synchronization signals).

In some implementations, sensor 205 may determine the sampling pattern based on receiving a group of sync signals. For example, sensor 205 may receive a first sync signal at a first time, a second sync signal at a second time, and a third sync signal at a third time. Here, sensor 205 may determine the sampling pattern as an average (e.g., a weighted average) of a time difference between the third time and the second time and a time difference between the second time and the first time. Additionally, or alternatively, sensor 205 may determine the sampling pattern based on identifying a (e.g., repeating) pattern of time differences between pairs of sync signals.

In some implementations, sensor 205 may update and/or modify the sampling pattern based on receiving additional sync signals. Continuing with the above described example, sensor 205 may determine the sampling pattern as a weighted average of the time difference between the third time and the second time and the time difference between the second time and the first time (e.g., where the time difference between the third time and the second time receives more weight than the time difference between the second time and the first time). Here, upon receiving a fourth sync signal at a fourth (e.g., later) time, sensor 205 may update the sampling pattern by determining a weighted average of a time difference between the fourth time and the third time, the time difference between the third time and the second time, and the time difference between the second time and the first time (e.g., where the time difference between the fourth time and the third time receives more weight than the time difference between the third time and the second time and the time difference between the second time and the first time).

In some implementations, sensor 205 may determine the sampling pattern when, for example, sensor 205 powers on, starts-up, resets, and/or the like. For example, after powering on, sensor 205 may receive a first sync signal, perform an associated sensor operation, and provide first sensor data. Sensor 205 may then receive a second sync signal, perform the associated sensor operation, and provide second sensor data. In this example, sensor 205 may determine (e.g., concurrently with performing the sensor operation associated with the second sync signal) the sampling pattern based on a time of receipt of the first sync signal and a time of receipt of the second sync signal. As another example, after powering on, sensor 205 may perform a first sensor operation in order to determine first sensor data, perform a second sensor operation in order to determine second sensor data, receive a first sync signal, and provide the first sensor data. Sensor 205 may then receive a second sync signal and provide the second sensor data. In this example, sensor 205 may determine the sampling pattern based on a time of receipt of the first sync signal and a time of receipt of the second sync signal.

As described below, based on the sampling pattern, sensor 205 may identify an expected time for receiving a third sync signal and trigger a sensor operation associated with the third sync signal (e.g., before receiving the third sync signal). In some implementations, after receiving the third sync signal, sensor 205 may update, modify, recalculate, and/or the like, the sampling pattern based on a time of receipt of the third sync signal.

In some implementations, the sampling pattern may be used to identify an expected time for receiving an upcoming synchronization signal (e.g., a time at which sensor 205 may expect to receive an upcoming sync signal). For example, sensor 205 may identify the expected time based on the sampling pattern and a time at which a previous (e.g., most recent) sync signal was received. As a particular example, if sensor 205 receives a sync signal at a particular time, then sensor 205 may determine an expected time, associated with the upcoming (e.g., next) sync signal, by adding an amount of time between receiving sync signals, identified by the sampling pattern, to the particular time at which the sync signal was received. Here, a result of adding the amount of time, identified by the sampling pattern, to the particular time at which the sync signal was received may identify the expected time of the upcoming sync signal.

In some implementations, a format of a signal (e.g., a sync signal, a signal carrying a specific address, and/or the like) may allow the signal to carry only information that identifies an address (e.g., a broadcast address, an address associated with a particular sensor 205, and/or the like). For example, the format of the signal may allow the signal to carry a value (e.g., an 8 bit value) that represents the address. Alternatively, a format of the signal may allow the signal to carry information that identifies the address and one or more other items of information (e.g., a read/write flag, a set of cyclic redundancy check (CRC) bits, and/or the like). In some implementations, the format of the signal may depend on a capability of ECU 210 (e.g., depending on whether a USIC of ECU 210 can be triggered over a hardware interrupt). Additional details regarding possible signal formats are described below with regard to FIGS. 9A and 9B.

As further shown in FIG. 3, process 300 may include triggering, based on the sampling pattern, a sensor operation associated with the upcoming synchronization signal (block 320). For example, sensor 205 may trigger, based on the sampling pattern, a sensor operation associated with the upcoming synchronization signal. In some implementations, the sensor operation may include, for example, sampling of a sensor signal and calculation of a sensor data based on sampling the sensor signal (herein collectively referred to as determination of sensor data).

In some implementations, sensor 205 may trigger the sensor operation, associated with the upcoming sync signal, based on an expected time for receiving the upcoming sync signal that is identified based on the sampling pattern. For example, sensor 205 may store, have access to, or determine an amount of time needed for sensor 205 to perform the sensor operation (e.g., an amount of time needed to sample a sensor signal and calculate sensor data). As a particular example, in some implementations, sensor 205 may determine the amount of time needed for sensor 205 to perform the sensor operation based on averaging amounts of time, associated with different cycles of performing the sensor operation by sensor 205. In some implementations, the amount of time need for sensor 205 to perform the sensor operation may be relatively consistent for each sensor cycle (e.g., such that sensor 205 may store information that identifies the amount of time and reuse the information).

Continuing with the above example, sensor 205 may determine, based on the sampling pattern, an expected time for receiving the upcoming sync signal. Here, based on the amount of time needed for sensor 205 to perform the sensor operation and the expected time for receiving the upcoming sync signal, sensor 205 may determine an amount of time that sensor 205 should wait (e.g., a delay time) before triggering performance of the sensor operation associated with the upcoming sync signal. In some implementations, the delay time may be an amount of time that sensor 205 is to wait after completing one cycle of the sensor operation (e.g., associated with a previously received synchronization signal) before initiating another cycle of the sensor operation. In some implementations, sensor 205 may be configured to determine the delay time such that sensor data, associated with the upcoming sync signal, is ready for transmission at or near (e.g., prior to) a time at which sensor 205 expects to receive the upcoming sync signal. In some implementations, as indicated in block 315 of FIG. 3, sensor 205 may wait for an amount of time, identified by the delay time, before triggering the performance of the sensor operation.

In some implementations, sensor 205 may be configured to implement a time buffer (e.g., an additional amount of time) in the delay time in order to ensure that the sensor data, associated with the upcoming sync signal, is ready for transmission before the sync signal (e.g., in order to prevent timing errors, prevent late transmission of sensor data, improve utilization of bus 215, and/or the like). In some implementations, sensor 205 may be configured to automatically adjust the delay time in order to ensure that the time buffer is provided, as described below with regard to FIGS. 5 and 6.

In this way, sensor 205 may anticipate the upcoming sensor signal and trigger performance of a sensor operation, associated with the upcoming sync signal, before receiving the upcoming sync signal.

As further shown in FIG. 3, process 300 may include transmitting sensor data, associated with the sensor operation, after receiving the upcoming synchronization signal (block 325). For example, sensor 205 may transmit the sensor data, associated with the sensor operation, after sensor 205 receives the upcoming synchronization signal (e.g., after sensor 205 completes the performance of the sensor operation). In some implementations, the sensor data may include information that identifies an actual time buffer, associated with the upcoming synchronization signal, as described elsewhere herein. In some implementations, sensor 205 may transmit the sensor data, associated with the upcoming synchronization signal, during a time period that at least partially overlaps (i.e., concurrently with) a time period during which sensor 205 waits for another upcoming synchronization signal.

In some implementations, as indicated in FIG. 3, process 300 may be repeated in association with anticipating additional (e.g., later) synchronization signals.

In some implementations, multiple sensors 205 may be configured to operate in a synchronous mode that causes the multiple sensors to sample their respective sensor signals at approximately the same time. For example, sensor 205-1 and sensor 205-2 may both receive a first sync signal provided by ECU 210 (e.g., a broadcast signal). Here, sensor 205-1 may provide first sensor 205-1 data (e.g., previously determined sensor data) based on the first sync signal, and sensor 205-2 may provide first sensor 205-2 data (e.g., previously determined sensor data) based on another signal provided by ECU 210 (e.g., a subsequent signal addressed to sensor 205-2). Next, sensor 205-1 and sensor 205-2 may both receive a second sync signal provided by ECU 210 (e.g., a second broadcast signal). Here, sensor 205-1 may provide second sensor 205-1 data (e.g., previously determined sensor data) based on the second sync signal, and sensor 205-2 may provide second sensor 205-2 data (e.g., previously determined sensor data) based on another signal (e.g., another subsequent signal addressed to sensor 205-2).

In this example, both sensor 205-1 and sensor 205-2 may each determine the sampling pattern, as described above, and may determine, based on the sampling pattern, an expected time for receiving the upcoming sync signal. Here, based on the expected time for receiving the upcoming sync signal, the multiple sensors 205 may each determine a delay time before triggering performance of respective sensor operations associated with the upcoming sync signal. For example, each sensor 205 may identify a time at which to trigger performance of the sensor operation based on the expected time for receiving the upcoming signal and an amount of time needed by sensor 205 to determine sensor data, as described above. As another example, each sensor 205 may identify a time at which to trigger performance of the sensor operation based on the expected time for receiving the upcoming signal and sync timing information configured on sensor 205. Here, the sync timing information may identify a point in time, before the expected time, at which sensor 205 is to trigger performance of the sensor operation (e.g., an amount of time from the expected time to offset triggering the performance of the sensor operation).

In some implementations, the delay times determined by the multiple sensors 205 may cause sampling of respective sensor signals, associated with determining sensor data for the upcoming sensor signal, to be synchronized (i.e., performed at approximately the same time) among the multiple sensors 205. For example, when an amount of time needed by each sensor 205 to determine sensor data matches (e.g., within a threshold amount of time, such as approximately 1 μs), the sampling of the respective signals, in association with determining sensor data for the upcoming sensor signal, is synchronized (e.g., performed at approximately the same time) among sensors 205. As another example, when the same sync timing information is configured on each sensor 205 (e.g., information that identifies the same amount of time to offset the triggering), the sampling of the respective signals, in association with determining sensor data for the upcoming sensor signal, may be synchronized among sensors 205. A detailed example of synchronous operation is described in detail below in association with FIG. 8.

In some implementations, the synchronous mode may be initiated by ECU 210 using a set of synchronization initialization signals (herein referred to as sync initialization signals). For example, ECU 210 may transmit the set of sync signals, and sensors 205 may be configured to begin operation in the sync mode based on receiving the set of sync signals (i.e., the set of sync signals may trigger synchronous mode operation of sensors 205). In some implementations, the set of sync signals may include a sync initialization break followed by an extended sync byte. In some implementations, the sync initialization break may include a multi-bit (e.g., 13 bit) dominant symbol (e.g., representing a value 0) indicating that sensors 205 are to "listen" for the extended sync byte. In some implementations, the extend sync byte may include a byte (e.g., with a value of 1010101) for synchronizing sensor 205 to a master clock. In some implementations, ECU 210 may provide a sync signal after providing the set of sync initialization signals. In some implementations, ECU 210 may initiate the synchronous mode during a startup phase associated with the sensor system. Additionally, or alternatively, ECU 210 may initiate the synchronous mode after the startup phase (e.g., if synchronization is lost during operation, ECU 210 can reinitiate the synchronous mode by sending another set of sync initialization signals).

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
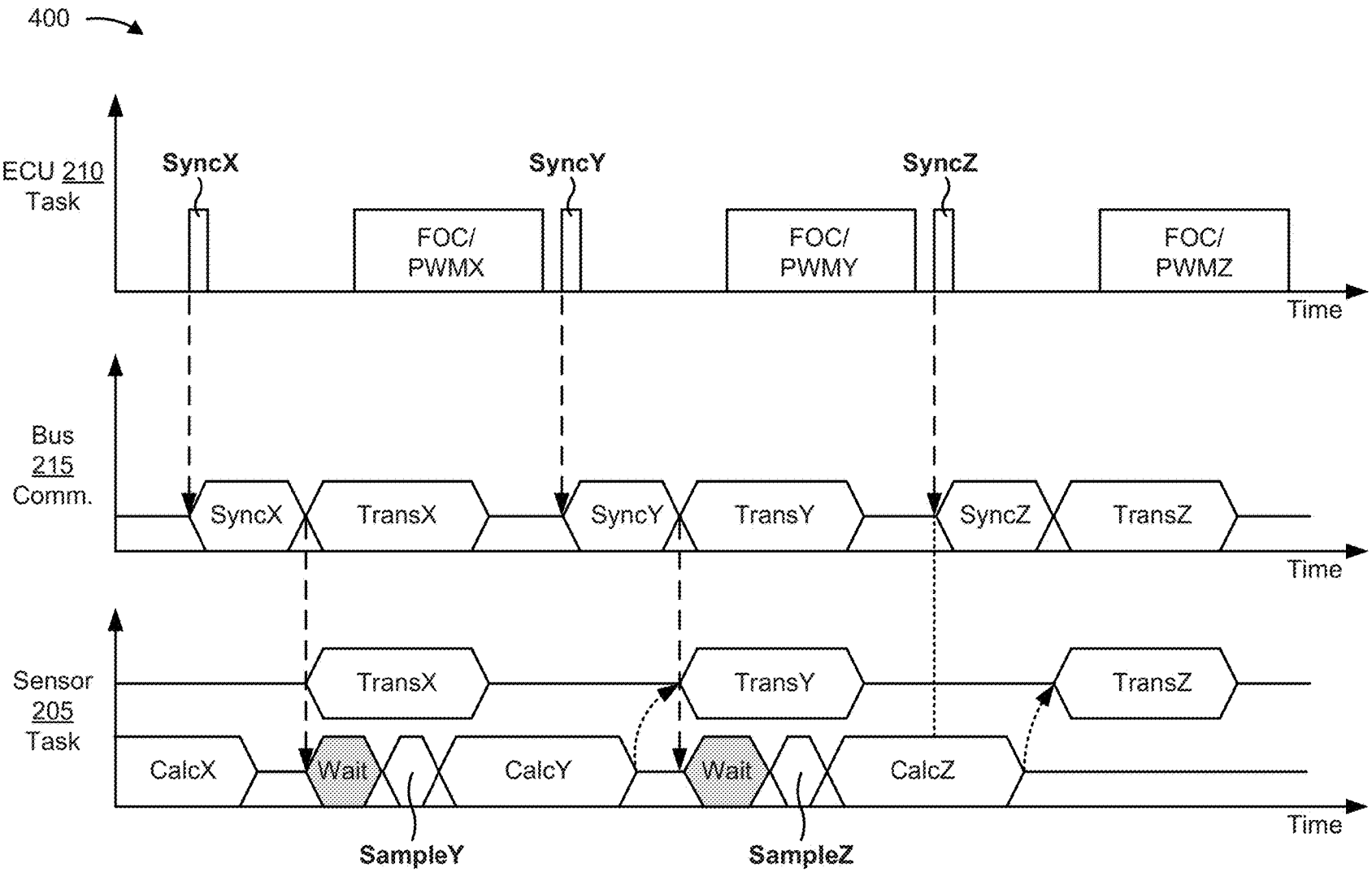
FIG. 4 is a diagram of an example implementation associated with the example process shown in FIG. 3.

FIG. 4 is a diagram of an example implementation 400 associated with example process 300 of FIG. 3. For the purposes of example implementation 400, sensor 205 has identified, based on previously received sync signals, a sampling pattern that identifies an amount of time between receiving a given pair of sync signals provided by ECU 210.

As shown in a lower portion of the sensor 205 task timeline of FIG. 4, sensor 205 has triggered performance of a sensor operation (CalcX), associated with sync signal X, based on anticipating receipt of sync signal X in accordance with the sampling pattern. As shown in the ECU 210 task timeline, ECU 210 transmits sync signal X (SyncX) after sensor 205 has started determining sensor data X. As shown by the bus 215 communication timeline, sensor 205 receives sync signal X via bus 215.

As further shown by the lower portion of the sensor 205 task timeline, sensor data X is ready before sensor 205 receives sync signal X. Thus, as shown by the upper portion of the sensor 205 task timeline and the bus 215 communication timeline, sensor 205 transmits sensor data X immediately after receiving sync signal X (TransX). As further shown by the ECU 210 task timeline, ECU 210 may being receiving sensor data X and performing one or more operations associated with sensor data X (e.g., pre-processing, field oriented control (FOC) calculation, space vector PWM (SVPWM), and/or the like).

As further shown by the lower portion of the sensor task timeline, sensor 205 may anticipate sync signal Y (i.e., a next sync signal) based on the sampling interval, and may trigger a sensor operation associated with sync signal Y (e.g., SampleY and CalcY) before receiving sync signal Y. As shown, sensor 205 may wait for a particular amount of time (e.g., a delay time) before triggering the sensor operation associated with sync signal Y such that sensor data Y is ready for transmission before sensor 205 receives sync signal Y. Sensor 205 and ECU 210 may proceed in a manner similar to that described above in order to allow ECU 210 to receive sensor data Y and sensor data Z (e.g., associated with a subsequent sync signal).

In some implementations, sensor 205 may adjust the delay time in order to implement a time buffer associated with ensuring that a given item of sensor data, associated with an anticipated sync signal, is ready for transmission by a time that sensor 205 receives the anticipated sync signal, as described below.

As indicated above, FIG. 4 is provided merely as an example. Other examples are possible and may differ from what was described with regard to FIG. 4.

Figure 5:
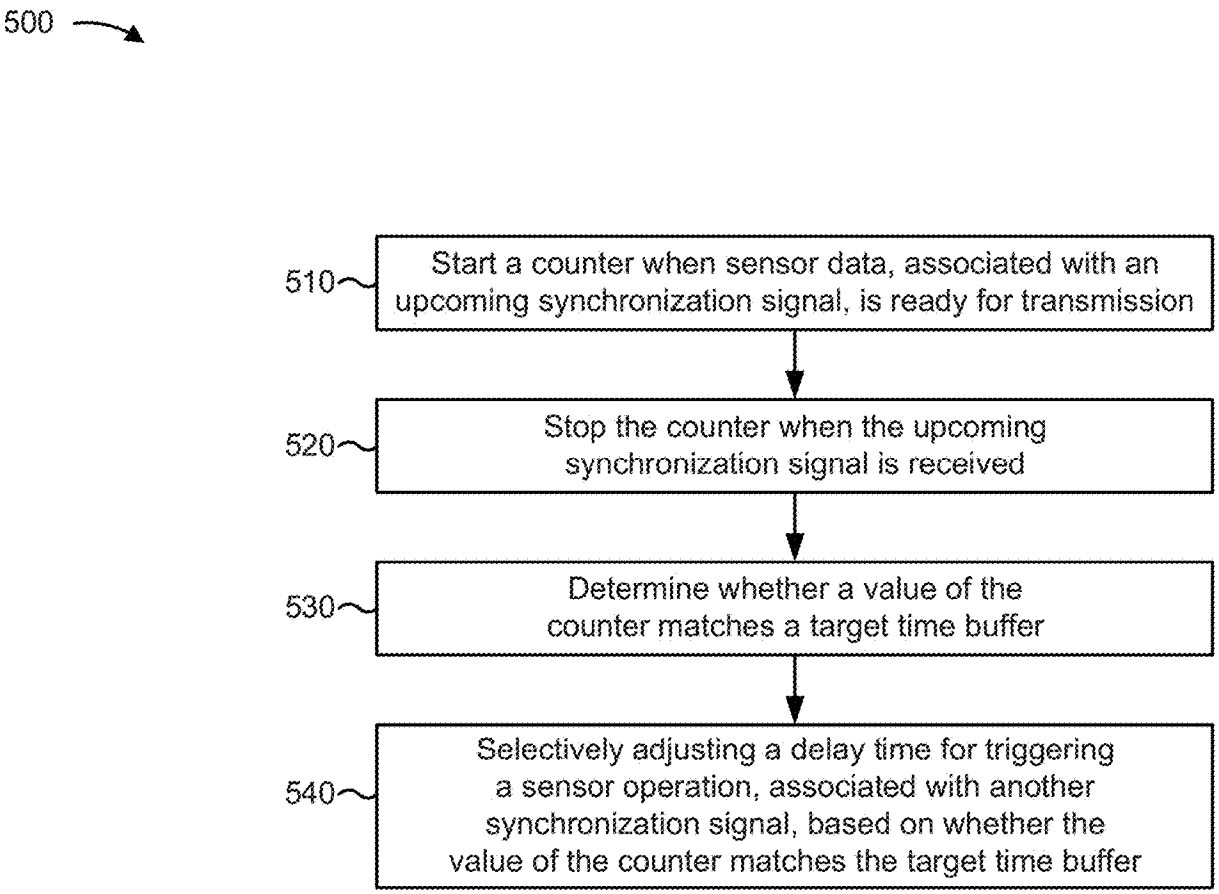
FIG. 5 is a flow chart of an example process for selectively adjusting a delay time for triggering a sensor operation associated with an upcoming synchronization signal.

FIG. 5 is a flow chart of an example process 500 for selectively adjusting a delay time for triggering a sensor operation associated with an upcoming synchronization signal. In some implementations, one or more process blocks of FIG. 5 may be performed by sensor 205.

As shown in FIG. 5, process 500 may include starting a counter when sensor data, associated with an upcoming synchronization signal, is ready for transmission (block 510). For example, sensor 205 may start a counter when sensor data, associated with an upcoming sync signal, is ready for transmission.

In some implementations, sensor 205 may start the counter when sensor 205 determines sensor data for an upcoming sync signal. For example, with reference to FIG. 4, sensor 205 may start the counter when sensor 205 determines sensor data X associated with upcoming sync signal X (e.g., sensor 205 may start the counter at the end of the CalcX block on the lower portion of the sensor 205 task timeline, before sensor 205 receives sync signal X).

As further shown in FIG. 5, process 500 may include stopping the counter when the upcoming synchronization signal is received (block 520). For example, sensor 205 may stop the counter when the upcoming sync signal is received.

In some implementations, sensor 205 may stop the counter when sensor 205 receives the upcoming sync signal. For example, with reference to FIG. 4, sensor 205 may stop the counter when sensor 205 receives sync signal X from ECU 210 (e.g., sensor 205 may stop the counter at the end of the Sync X block on the bus 215 communication timeline).

As further shown in FIG. 5, process 500 may include determining whether a value of the counter matches a target time buffer (block 530). For example, sensor 205 may determine whether a value of the counter matches a target time buffer.

The value of the counter represents an amount of time between a time at which sensor data, associated with a sync signal, is ready for transmission, and a time at which a sync signal, associated with transmitting the sensor data, is received. In other words, the value of the counter represents an actual time buffer between a time at which a determination of sensor data is complete and a time at which the sensor data is to be transmitted.

The target time buffer identifies a target time buffer to be implemented by sensor 205 in order to, for example, ensure that the sensor data, associated with the upcoming sync signal, is ready for transmission before the sync signal (e.g., in order to prevent timing errors, prevent late transmission of sensor data, improve utilization of bus 215, and/or the like). In some implementations, sensor 205 may store or have access to information that identifies the target time buffer (e.g., the target time buffer may be configured on sensor 205).

In some implementations, sensor 205 may determine whether the value of the counter (i.e., the actual time buffer) matches the target time buffer based on comparing the value of the counter and the target time buffer. For example, if sensor 205 determines that the value of the counter differs from (e.g., is less than or is greater than) the target time buffer by an amount of time that is more than a threshold amount (e.g., 0.2 μs, 0.5 μs, 2 μs, and/or the like), then sensor 205 may determine that the value of the counter does not match the target time buffer. As another example, if sensor 205 determines that the value of the counter differs from the target time buffer by an amount of time that is less than or equal to the threshold amount, then sensor 205 may determine that the value of the counter matches the target time buffer.

As further shown in FIG. 5, process 500 may include selectively adjusting a delay time for triggering a sensor operation, associated with another synchronization signal, based on whether the value of the counter matches the target time buffer (block 540). For example, sensor 205 may selectively adjust a delay time for triggering a sensor operation, associated with another synchronization signal, based on whether the value of the counter matches the target time buffer.

In some implementations, when the value of the counter matches the target time buffer, selectively adjusting the delay time may include refraining from adjusting the delay time. For example, if sensor 205 determines that the value of the counter matches the target time buffer, then no adjustment to the delay time may be needed (e.g., since the target time buffer is already being implemented by sensor 205).

In some implementations, when the value of the counter does not match the target time buffer, selectively adjusting the delay time may include increasing or decreasing the delay time associated with triggering a sensor operation for another sync signal (e.g., a next sync signal). For example, if sensor 205 determines that the value of the counter does not match the target time buffer, and the value of the counter is less than the target time buffer (i.e., that the actual time buffer is shorter than the target time buffer by more than a threshold amount), then sensor 205 may adjust the delay time by decreasing the delay time. Here, by decreasing the delay time, sensor 205 causes the sensor operation, associated with the other sync signal, to be triggered at a comparatively earlier time, which results in a comparatively longer actual time buffer when sensor 205 transmits sensor data associated with the other sync signal.

As another example, if sensor 205 determines that the value of the counter does not match the target time buffer, and the value of the counter is greater than the target time buffer (i.e., that the actual time buffer is longer than the target time buffer by more than a threshold amount), then sensor 205 may adjust the delay time by increasing the delay time. Here, by increasing the delay time, sensor 205 causes the sensor operation, associated with the other sync signal, to be triggered at a comparatively later time, which results in a comparatively shorter actual time buffer when sensor 205 transmits sensor data associated with the other sync signal.

In some implementations, sensor 205 may adjust the delay time in order to cause an actual time buffer, associated with another sync signal, to match the target time buffer. For example, sensor 205 may adjust the day time by an amount of time that corresponds to a difference between the computed actual time buffer and the target time buffer configured on sensor 205. As another example, sensor 205 may adjust the delay time by a particular amount (e.g., an incremental amount, configured on sensor 205, that is less than the difference between the computed actual time buffer and the target time buffer).

In this way, sensor 205 may selectively adjust the delay time in order to ensure that sensor data, associated with an upcoming sync signal, is ready for transmission before the sync signal, without introducing an undesirable amount of latency between performance of a sensor operation and transmission of corresponding sensor data.

In some implementations, sensor 205 may transmit information that identifies the counter value (i.e., information that identifies a length of the actual time buffer). For example, in addition to transmitting sensor data, associated with a given sync signal, sensor 205 may transmit information that identifies the counter value (e.g., in a same data output frame). In some implementations, the information that identifies the counter value may be used by ECU 210 to improve accuracy of the sensor system by, for example, reducing latency time jitter.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
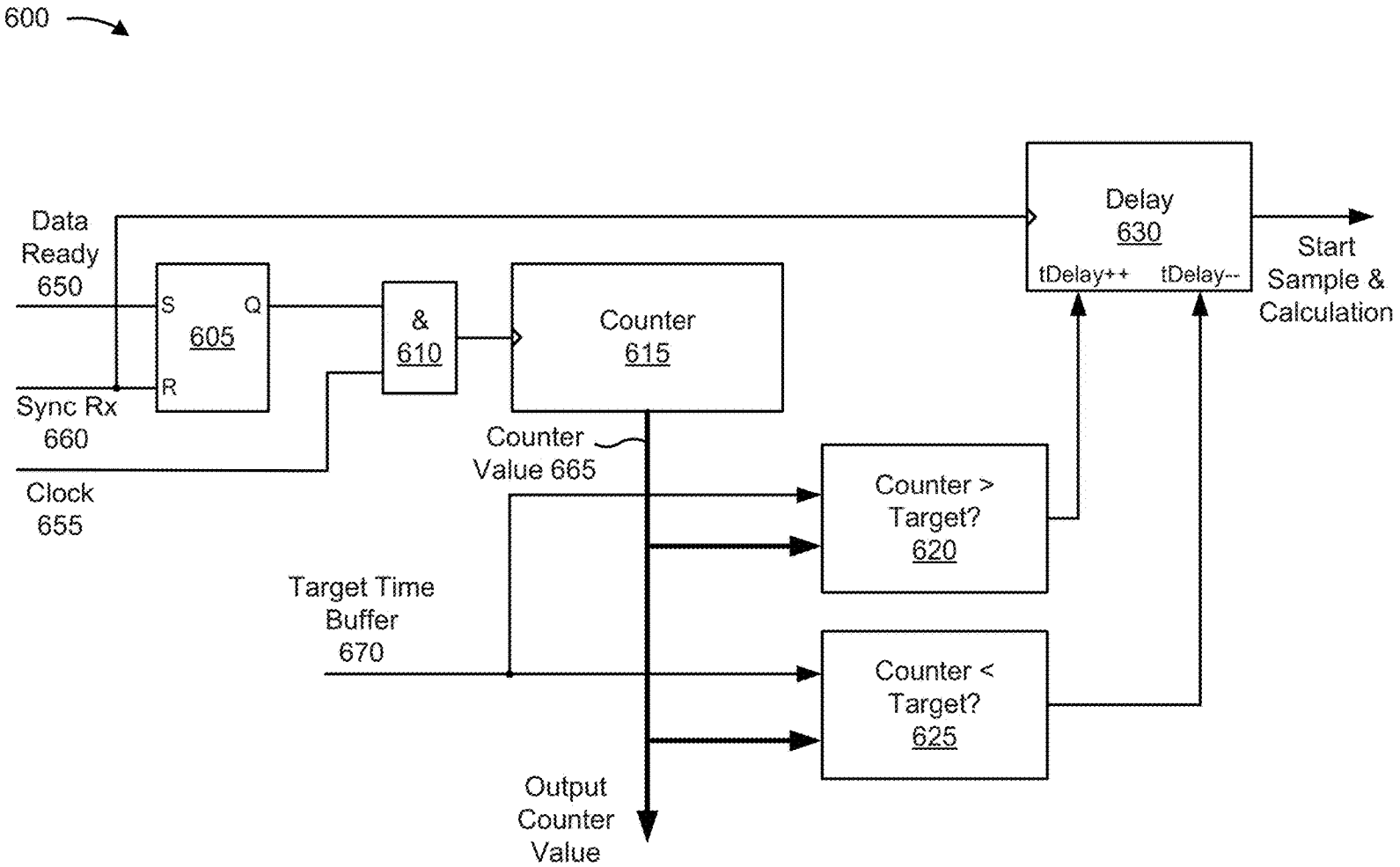
FIG. 6 is a diagram of an example implementation associated with example process shown in FIG. 5.

FIG. 6 is a diagram of an example implementation 600 associated with example process 500 of FIG. 5. In some implementations, example implementation 600 may be implemented in one or more components or devices included in sensing device 220 described above.

As shown in FIG. 6, component 605 (e.g., a set-reset (SR) component) may receive an indication 650 indicating that sensor data, associated with an upcoming sync signal, is ready for transmission. As further shown, an output of component 605 is provided to component 610 (e.g., an AND gate) that also receives a clock 655. Here, counter 615 starts based on the output of component 605 in response to indication 650, where counter 615 starts counting based on clock 655.

As further shown, component 605 may receive (e.g., at a later time) an indication 660 indicating that the upcoming sync signal, associated with the sensor data, has been received by sensor 205. Here, an output of component 605, in response to indication 660, changes an output of component 610. Here, based on the changed output of component 610, counter 615 stops counting.

As further shown, after counter 615 stops, counter 615 outputs counter value 665 that identifies a value of counter 615 at the time that counter 615 stopped counting. As shown, counter 615 may provide counter value 665 to component 620 (e.g., a first comparator) and to component 625 (e.g., a second comparator). In this example, component 620 is configured to determine whether counter value 665 is greater than target time buffer 670 by more than a threshold amount, and component 625 is configured to determine whether counter value 665 is less than target time buffer 670 by more than a threshold amount. As further shown, in some implementations, counter 615 may provide counter value 665 for output with the sensor data, as described above.

Continuing with this example, if component 620 determines that counter value 665 is greater than target time buffer 670 by more than the threshold amount, then component 620 may provide, to delay component 630, an output that causes a delay time, implemented by delay component 630 in association with a sensor operation for another (e.g., next) sync signal, to be increased (e.g., by an incremental amount tDelay++). Conversely, if component 620 determines that counter value 665 is not greater than target time buffer 670, then component 620 may provide no such output.

Similarly, if component 625 determines that counter value 665 is less than target time buffer 670 by more than the threshold amount, then component 625 may provide, to delay component 630, an output that causes the delay time to be decreased (e.g., by an incremental amount tDelay−−). Conversely, if component 625 determines that counter value 665 is not less than target time buffer 670, then component 625 may provide no such output.

Here, delay component 630 causes sensor 205 to trigger a sensor operation, associated with another sync signal, in accordance with the delay time stored on delay component 630. In some implementations, the above process may be repeated for multiple (e.g., successive) cycles in order to continuing adjusting the delay time, as needed.

As indicated above, FIG. 6 is provided merely as an example. Other examples are possible and may differ from what was described with regard to FIG. 6.

Figure 7:
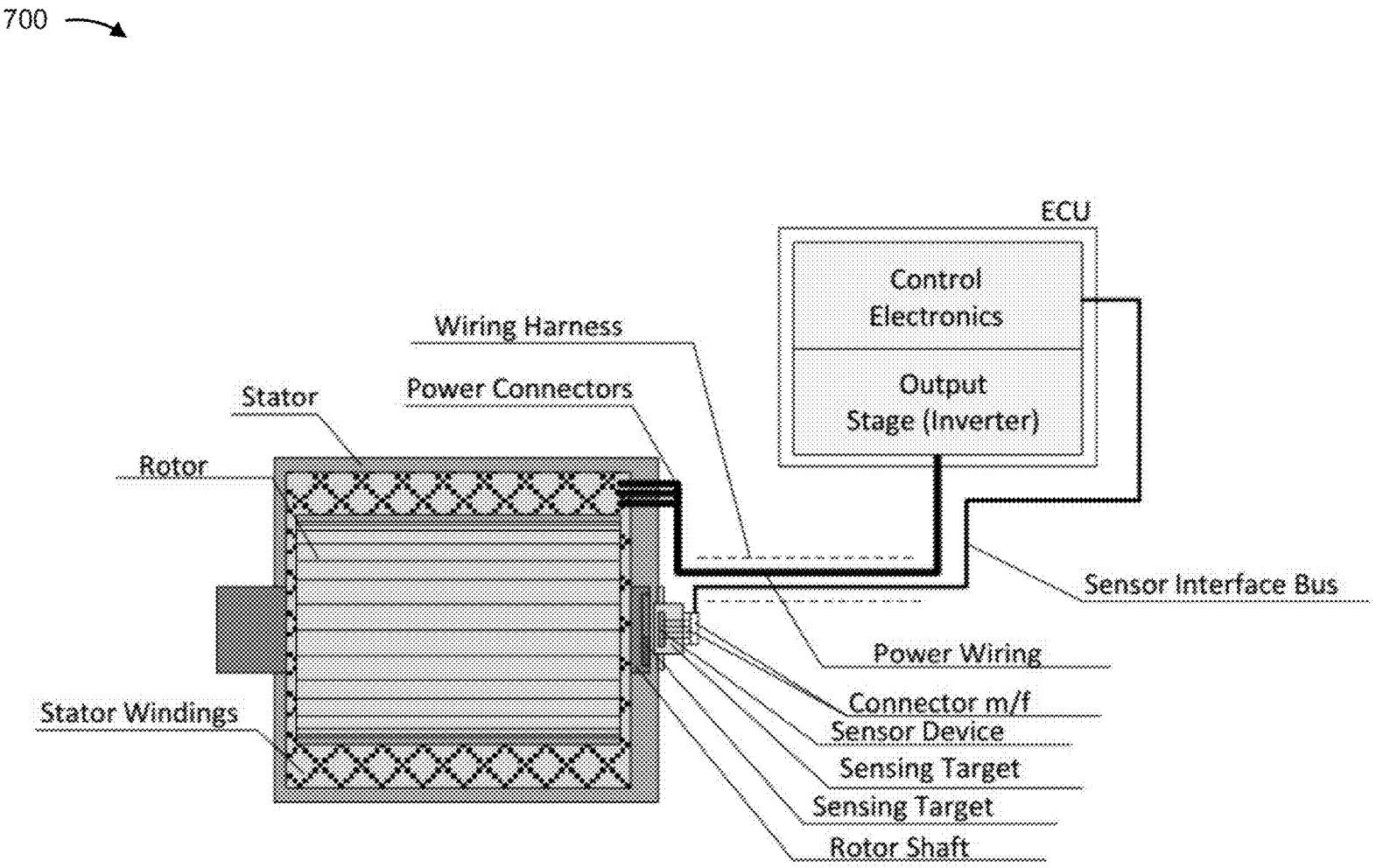
FIG. 7 is a diagram illustrating an example application of the sensor system described herein.

FIG. 7 is a diagram associated with an example application 700 of the sensor system described herein. As shown in FIG. 7, the sensor system, described herein, may be implemented in a motor control application. For example, for the reasons described above, an ECU may be separated from a motor in such an application. Thus, a sensor (e.g., an end-of-shaft a rotor position sensor or an out-of-shaft rotor position sensor) cannot be embedded in or positioned near the ECU.

In such a case, the sensor may be synchronized with the ECU, via a digital interface, and while achieving an improved sensor update rate (e.g., as compared to the conventional synchronization technique, using the techniques described herein As indicated above, FIG. 7 is provided merely as an example. Other examples are possible and may differ from what was described with regard to FIG. 7.

Figure 8:
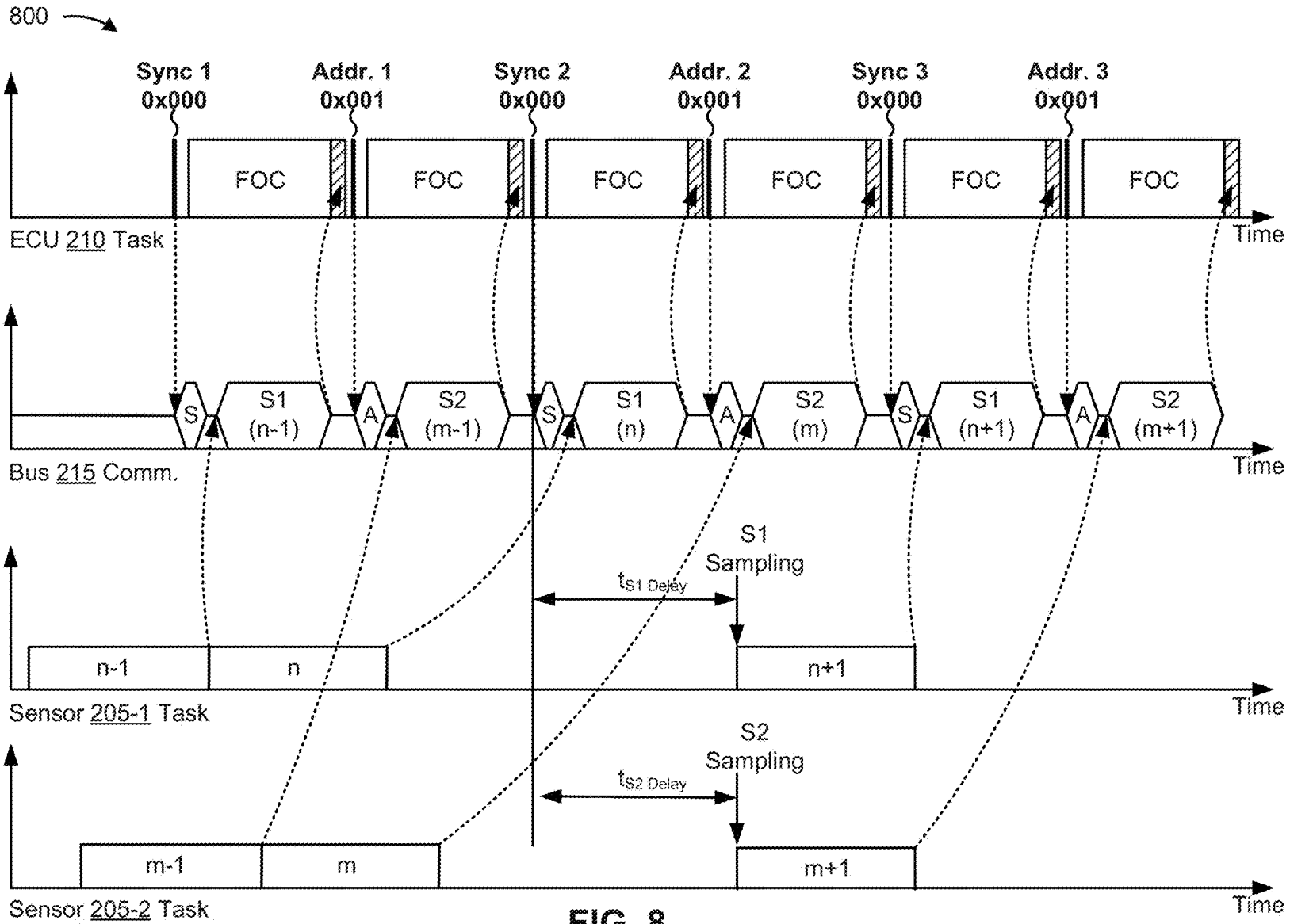
FIG. 8 is a diagram of an example implementation associated with a synchronous mode of operation as described with regard to the example process of FIG. 3.

FIG. 8 is a diagram of an example implementation 800 associated with a synchronous mode of operation as described above with regard to example process 300. For the purposes of example implementation 800, sensor 205-1 and sensor 205-2 have received, from ECU 210, a set of sync initialization signals associated with initiating a synchronous mode of operation, as described above. Further, sensor 205-1 has determined first data and second data (e.g., identified in FIG. 8 as n−1 and n, respectively, in the time line of sensor tasks of first sensor 205-1) and sensor 205-2 has determined first and second data (e.g., identified in FIG. 8 as m−1 and m, respectively, in the time line of sensor tasks of second sensor 205-2) during, for example, a startup phase associated with starting the sensor system.

Further in example 800, address 0x000 is configured as a broadcast address and a read address on sensor 205-1, while address 0x000 is configured as a broadcast address on sensor 205-2 and address 0x001 is configured as a read address on sensor 205-2.

As shown in FIG. 8, ECU 210 may first transmit sync signal 1 (e.g., including address 0x000). As further shown, sensor 205-1 may provide first sensor data of sensor 205-1 (e.g., n−1) after sensor 205-1 receives sync signal 1 (e.g., since address 0x000 is the read address of sensor 205-1). As further shown, after the first sensor data of sensor 205-1 is received by ECU 210, or at least transmitted over bus 215 (e.g., as depicted in FIG. 8), ECU 210 may transmit another signal (e.g., address signal 1 including address 0x001). As shown, sensor 205-2 may provide the first sensor data of sensor 205-2 (e.g., m−1) after sensor 205-2 receives the other signal (e.g., since address 0x001 is the read address of sensor 205-2).

As further shown, after ECU 210 receives the first sensor 205-2 data over bus 215, ECU 210 may transmit sync signal 2 (e.g., including address 0x000). As shown, sensor 205-1 may provide the second data of sensor 205-1 (e.g., n) after sensor 205-1 receives sync signal 2 (e.g., since address 0x000 is the read address of sensor 205-1). As further shown, after the second data of sensor 205-1 data is received by ECU 210, ECU 210 may transmit another signal (e.g., address signal 2 including address 0x001). As shown, sensor 205-2 may provide the second data of sensor 205-2 (e.g., m) after sensor 205-2 receives the other signal (e.g., since address 0x001 is the read address of sensor 205-2).

In this example, both sensor 205-1 and sensor 205-2 may determine a sampling pattern based on the first and second sync signals (e.g., in the manner described above), and may determine, based on the sampling pattern, an expected time for receiving the upcoming sync signal (e.g., sync signal 3). Here, based on the expected time for receiving the upcoming sync signal, sensors 205-1 and 205-2 may determine a delay time before triggering performance of respective sensor operations associated with the upcoming sync signal (e.g., in order to determine third data of sensor 205-1 and third data of sensor 205-2 sensor, identified in FIG. 8 as n+1 and m+1, respectively).

In some implementations, as shown in FIG. 8, the delay times (e.g., identified in FIG. 8 as $t_{S1\ Delay}$ and $t_{S2\ Delay}$) may be determined such that sampling of respective sensor signals, associated with performing the respective sensors operations, is performed at the same time at sensor 205-1 and sensor 205-2. For example, when an amount of time needed by sensor 205-1 to determine sensor data matches (e.g., within a threshold amount of time, such as approximately 1 μs) an amount of time needed by sensor 205-2 to determine sensor data, the delay times may be determined such that the sampling of the respective sensor signals is performed at approximately the same time. Thus, as further shown in FIG. 8, sensor 205-1 and sensor 205-2 may trigger performance of the respective sensor operations (e.g., associated with determining third sensor 205-1 data and third sensor 205-2 data, respectively) based on the delay times.

As further shown, ECU 210 may transmit sync signal 3 (e.g., including address 0x000) over bus 215. As shown, sensor 205-1 may provide the third data of sensor 205-1 (e.g., n+1) after sensor 205-1 receives sync signal 3 (e.g., since address 0x000 is the read address of sensor 205-1). As further shown, after the third data of sensor 205-1 is received by ECU 210, ECU 210 may transmit another signal (e.g., address signal 3 including address 0x001). As shown, sensor 205-2 may provide the third data of sensor 205-2 (e.g., m+1) after sensor 205-2 receives the signal (e.g., since address 0x001 is the read address of sensor 205-2). In this way, the sampling of sensor signals may be synchronized among multiple sensors 205 (e.g., such that sensor data from each sensor 205 has a same time stamp even though the sensor data is received by ECU 210 at different times), which may improve control of one or more electrical systems and/or electrical subsystems based on the sensor data provided by sensors 205.

As indicated above, FIG. 8 is provided merely as an example. Other examples are possible and may differ from what was described with regard to FIG. 8.

Figure 9A:
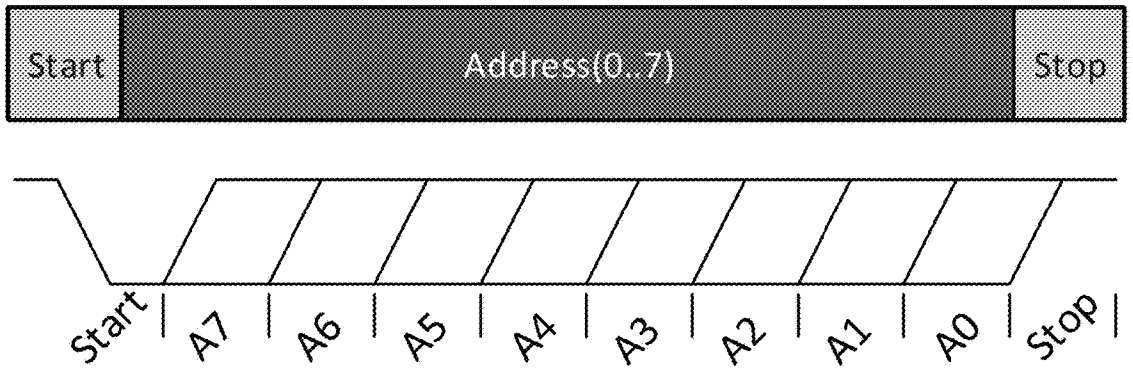
FIGS. 9A and 9B are diagrams of example formats for a signal that may be provided by the ECU of FIG. 2.
Figure 9B:
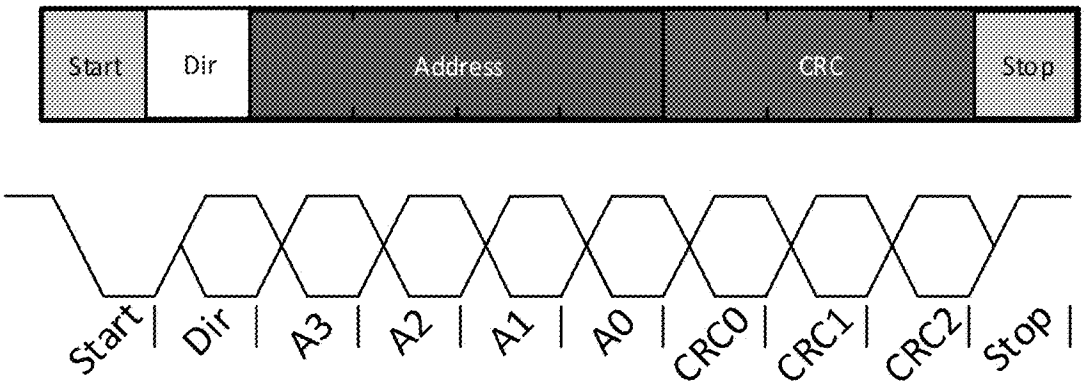

FIGS. 9A and 9B are diagrams of example formats 900 and 950, respectively, for a signal that may be provided by ECU 210 as described herein.

As shown in FIG. 9A, in some implementations, a signal (e.g., a sync signal, a signal carrying a specific address, and/or the like) may be formatted to include a start bit, a group of address bits (e.g., identified in FIG. 9A as bits A0 through A7), and a stop bit. Thus, in some implementations, the signal format may allow the signal to carry only information that identifies an address (e.g., a broadcast address associated with multiple sensors 205, an address associated with a particular sensor 205, and/or the like). In some implementations, the signal format shown in FIG. 9A may be used for a time-critical transmission (e.g., a sync signal) when a component of ECU 210, associated with generating or providing the signal, cannot be triggered over a hardware signal (i.e., when the USIC transmission is not triggerable using a signal without software interaction causing latency jitter).

Notably, example format 900 supports a limited number of bit combinations. In some implementations, a pulse corresponding to example format 900 may be interpreted as a single pulse with a length of (n+1) $T_{Bit}$ low-time, followed by one $T_{Bit}$ high-time representing a stop bit, where a total length of a pulse according to format 900 is constant.

$T_{Bit}$ represents a length of a single bit (e.g., 1/baud rate) and in represents an address. In some implementations, a signal using the relatively simple example format 900 may be generated by a UART transmitter, a PWM component, and/or the like.

In some implementations, the address patterns available when using example format 900 may be used to read data from sensors 205. In some implementations, data download to sensors 205 can be established by a write access, followed by parameter data bytes.

As shown in FIG. 9B, in some implementations, a signal may be formatted to include a start bit, a read/write bit (e.g., identified in FIG. 9B as a directory (dir) bit), a group of address bits (e.g., identified in FIG. 9B as bits A0 through A3), a set of CRC bits (e.g., identified in FIG. 9B as and bits CRC0 through CRC2), and a stop bit. In some implementations, the signal format shown in FIG. 9B may be used for a time-critical transmission (e.g., a sync signal) when a component of ECU 210, associated with generating or providing the signal, can be triggered over a hardware signal (i.e., when the USIC transmission is triggerable).

As indicated above, FIGS. 9A and 9B are provided merely as examples. Other examples are possible and may differ from what was described with regard to FIGS. 9A and 9B.

In some implementations, the high speed sensor interface, described above, may use a bus system with a physical layer defined by a particular bus system standard. For example, the high speed sensor interface may use a local interconnected network (LIN) 3-wire interface designed to provide data transmission rates between 1 and 20 kilobits per second (kBit/s), as described by ISO standard 17987. As another example, the high speed sensor interface may use a fault tolerant controller area network (CAN) bus designed to provide a data transmission rate of 125 kBit/s, as described by ISO standard 11898-3. As another example, the high speed sensor interface may use a CAN bus designed to provide a data transmission rate of up to 1 megabits per second (MBit/s), as described by ISO standard 11898-2. As another example, the high speed sensor interface may use a CAN bus designed to provide a data transmission rate of up to 5 MBit/s, as described by ISO standard 11898-5. As another example, the high speed sensor interface may use a FlexRay bus designed to provide a data transmission rate of up to 10 MBit/s, as described by ISO standard 7458-4.

Additionally, or alternatively, the high speed sensor interface, described above, may provide one or more other capabilities associated with a given bus system standard (e.g., LIN, CAN (ISO 11898-5), FlexRay, and/or the like). For example, the high speed sensor interface may provide a wake-up capability to sensor 205 and/or ECU 210. The wake-up capability allows a given sensor 205 and/or ECU 210 to operate in a sleep mode (i.e., a low-power mode) until being "woken up" in order to begin normal operation. In some implementations, in order to provide the wake-up capability, a given sensor 205 and/or ECU 210 may be directly connected to a battery). In some implementations, the given sensor 205 and/or ECU 210 can be woken up based on a signal provided via bus 215 (i.e., a bus wakeup). For example, the given sensor 205 and/or ECU 210 may wake up based on receiving a signal on bus 215 that has a particular format, as described by the applicable bus system standard.

In some implementations, the wake-up signal may cause each sensor 205 and/or ECU 210 to wake up (e.g., when each sensor 205 and ECU 210 is configured to wake up based on detecting a signal of the same format). In other words, in some implementations, the wake-up capability may not be a selective wake-up capability. Additionally, or alternatively, the wake-up signal may cause a particular sensor 205 and/or ECU 210 to wake (e.g., when sensors 205 and ECUs 210 are configured to wake based on detecting differently formatted signals). In other words, in some implementations, the wake-up capability may be a selective wake-up capability (e.g., as described by ISO 11898-6 for a CAN bus).

In either case, when a signal with the appropriate format is detected, sensor 205 and/or a second ECU 210 on bus 215 may wake from the sleep mode and begin operation. In some implementations, the wake-up capability is advantageous in that the given sensor 205 and/or ECU 210 can begin operation immediately (e.g., as compared to beginning operation after being powered-off). Another advantage is that a number of pins used on the given ECU 210 may be reduced (e.g., since a wake-up capable sensor 205 need not be supplied by ECU 210, since a wake-up capable ECU 210 does not need a sensor supply pins). Furthermore, the wake-up capability may reduce an amount of current consumed by the given sensor 205 and/or ECU 210 in sleep mode and/or may increase a lifetime of the given sensor 205 and/or ECU 210.

Figure 10:
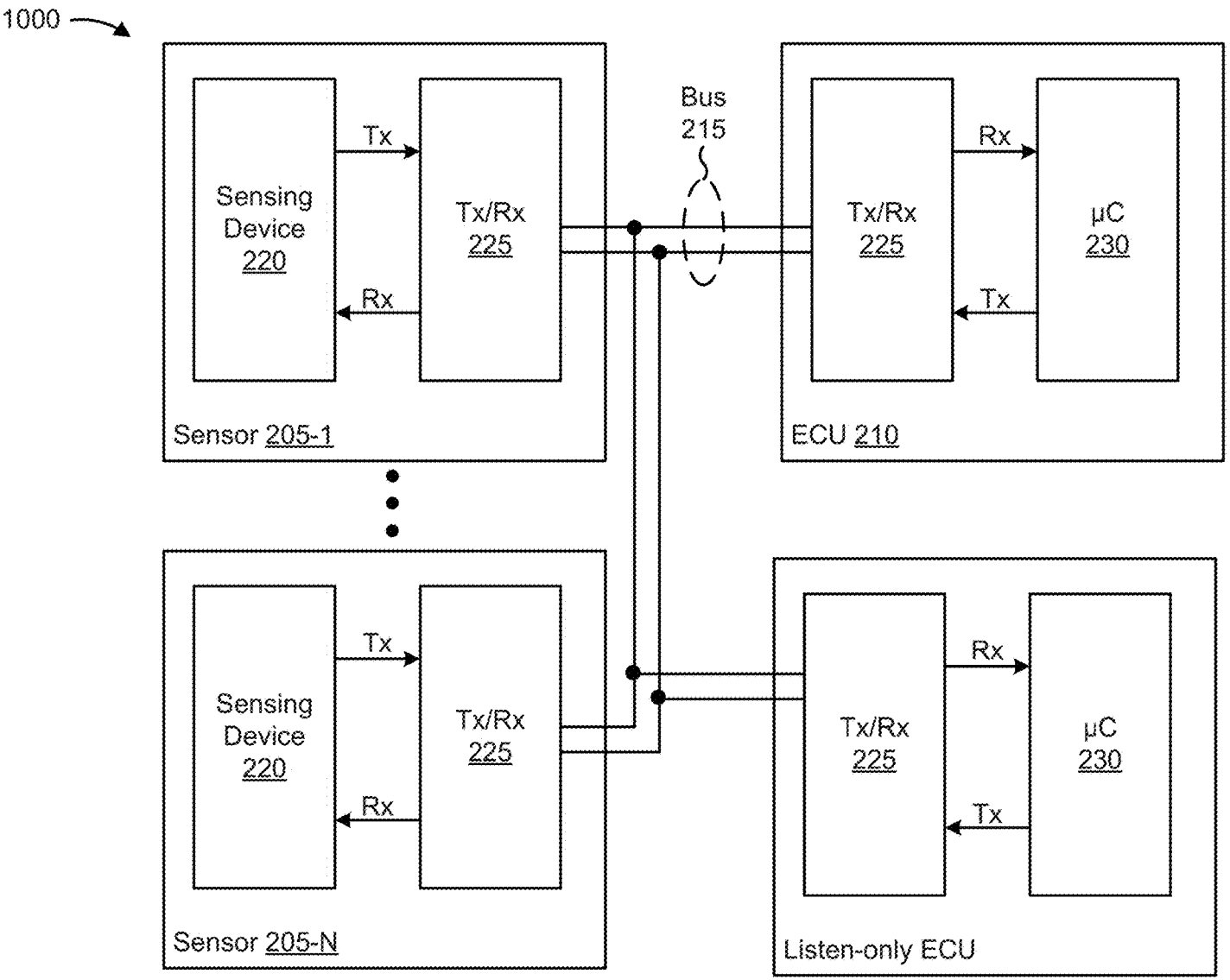
FIG. 10 is a diagram of an example environment including a listen-only ECU, as described herein.

As another example, the high speed sensor interface may provide a listen-only capability in a sensor system (e.g., in accordance with a bus system standard such as LIN, CAN (ISO 11898-6), FlexRay, and/or the like) with multiple ECUs. FIG. 10 is a diagram of an example environment 1000 including a listen-only ECU. As shown in FIG. 10, in some implementations, a listen-only ECU may be connected to bus 215 (e.g., in addition to ECU 210). In some implementations, the listen-only ECU may be configured to "listen" to transmissions on bus 215 and may be configured to refrain from sending transmissions on bus 215. Thus, in some implementations, the listen-only ECU may be capable of receiving sensor data (e.g., provided by sensor 205 based on a signal provided by ECU 210) without transmitting any signal on bus 215. Here, the listen-only capability allows the listen-only ECU to receive sensor data with reduced latency. This is to say, the listen-only ECU receives data from sensors (e.g., sensor 205-1 through sensor 205-N) at the same time and the same quality as the ECU 210. While when communicating the sensor data from ECU 210 over a further communication means (not shown) to the listen-only ECU, such transmission would be delayed as compared to the listen-only mode. It is to be appreciated that the listen-only ECU may receive the sensor data even, if the ECU 210 is no longer working properly.

In some implementations, the listen-only capability provides a functional safety feature in the sensor system. For example, the listen-only ECU may provide a functional safety feature in terms of reducing latency associated with receiving the sensor data (as described above) at the listen-only ECU (e.g., such that time-critical information can be received in real-time or near real-time). As another example, the listen-only ECU may provide a functional safety feature by acting as a backup or a fail-over in the event that ECU 210 experiences an error, is disabled, loses power, and/or the like. As another example, the listen-only ECU may provide a functional safety feature by monitoring operation of sensors 205 and/or ECU 210 in the sensor system.

Some implementations described herein provide techniques for apparatuses for synchronization of a sensor (e.g., a remote sensor) with an ECU, via a digital interface, while achieving an improved sensor update rate (e.g., as compared to the conventional synchronization technique described above). In some implementations, such improved synchronization may be achieved by configuring the sensor based on a self-adjusting trigger technique used to anticipate an upcoming synchronization signal, as described in further detail below.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:

a sensor to:

determine, based on two or more synchronization signals provided by a control device, an expected time for receiving an upcoming synchronization signal; and perform a measurement of a sensor signal at a point in time such that sensor data, corresponding to the measurement of the sensor signal at the point in time, is available at a selectable time interval prior to the expected time for receiving the upcoming synchronization signal,

*wherein a length of the selectable time interval is controlled based on a point in time at which the upcoming synchronization signal is received.*

2. The system of claim 1, wherein the sensor is further to:

perform another measurement of the sensor signal based on a synchronization signal provided by the control device; and calculate sensor data corresponding to the other measurement of the sensor signal.

3. The system of claim 1, wherein a length of the selectable time interval is less than or equal to a length of a synchronization period defined by the two or more synchronization signals.

[4. The system of claim 1, wherein a length of the selectable time interval is controlled based on a point in time at which the upcoming synchronization signal is received.]

5. The system of claim 1, wherein the sensor is further to:

receive the upcoming synchronization signal; and transmit the sensor data, corresponding to the measurement of the sensor signal at the point in time, in response to receiving the upcoming synchronization signal.

6. The system of claim 1, wherein the sensor is a first sensor, the sensor signal is a first sensor signal, the sensor data is first sensor data, and the selectable time interval is a first selectable time interval, wherein the system further comprises a second sensor to:

determine, based on the two or more synchronization signals provided by the control device, the expected time for receiving the upcoming synchronization signal; and perform a measurement of a second sensor signal at the point in time such that sensor data, corresponding to the measurement of the second sensor signal at the point in time, is available at a second selectable time interval.

7. The system of claim 6, wherein the second sensor is further to:

perform another measurement of the second sensor signal based on a signal provided by the control device; and calculate sensor data corresponding to the other measurement of the second sensor signal.

8. The system of claim 6, wherein a length of the second selectable time interval is less than or equal to a length of a synchronization period defined by the two or more synchronization signals.

9. The system of claim 6, wherein a length of the second selectable time interval is controlled based on a point in time at which the upcoming synchronization signal is received.

10. The system of claim 6, wherein a length of the second selectable time interval matches a length of the first selectable time interval.

11. The system of claim 6, wherein a read address of the first sensor matches a broadcast address associated with the first sensor and the second sensor.

12. The system of claim 6, wherein the second sensor is further to:

receive a signal including information that identifies a read address of the second sensor; and transmit the sensor data, corresponding to the measurement of the second sensor signal at the point in time, in response to receiving the signal including the information that identifies the read address of the second sensor.

13. The system of claim 12, wherein the read address of the second sensor is different from a broadcast address associated with the first sensor and the second sensor.

14. The system of claim 6, wherein the first sensor or the second sensor, when determining the expected time for receiving the upcoming synchronization signal, are to:

determine the expected time based on a time difference between a time at which a first synchronization signal is received and a time at which a second synchronization signal is received, wherein the first synchronization signal and the second synchronization signal are included in the two or more synchronization signals.

15. The system of claim 6, wherein a synchronization signal, of the two or more synchronization signals, includes only information that identifies a broadcast address associated with the first sensor and the second sensor.

16. The system of claim 6, wherein a synchronization signal, of the two or more synchronization signals, includes information that identifies a broadcast address associated with the first sensor and the second sensor, a read/write bit, and a set of cyclic redundancy check (CRC) bits.

17. The system of claim 1, wherein a physical layer of the system includes a local interconnected network (LIN) bus, a controller area network (CAN) bus system, or a FlexRay bus.

18. The system of claim 1, further comprising a listen-only control device that is to receive the sensor data.

19. A sensor, comprising:

one or more components to:

determine an expected time for receiving an upcoming synchronization signal, wherein the expected time is determined based on a group of synchronization signals provided by a control device associated with the sensor;

sample a sensor signal at a point in time such that sensor data, calculated based on sampling the sensor signal at the point in time, is available at a selectable time interval prior to the sensor receiving the upcoming synchronization signal,

*wherein a length of the selectable time interval is controlled based on a point in time at which the upcoming synchronization signal is received*;

calculate the sensor data based on sampling the sensor signal at the point in time; and provide the sensor data after receiving the upcoming synchronization signal.

20. A control device, comprising:

one or more components to:

provide a group of synchronization signals to a set of sensors, wherein the group of synchronization signals defines a sampling pattern for identifying an expected time associated with another synchronization signal;

provide the other synchronization signal; and receive *first* sensor data from a sensor, of the set of sensors, after providing the other synchronization signal, wherein, based on the sampling pattern, the *first* sensor data is available at the *first* sensor before the other synchronization signal is received by the *first* sensor,

*provide a further signal; and*

*receive second sensor data from a second sensor, of the set of sensors, after providing the further signal,*

*wherein at least one of:*

*a read address of the first sensor matches a broadcast address associated with the first sensor and the second sensor, or*

*a read address of the second sensor is different from a broadcast address associated with the first sensor and the second sensor.*

21. The control device of claim 20, wherein [the sensor is a first sensor and the sensor data is first sensor data, wherein the one or more components are further to:

provide another signal; and receive second sensor data from a second sensor, of the set of sensors, after providing the signal, wherein a sampling time, associated with the second sensor data, matches a sampling time associated with the first sensor data, and wherein the first sensor data and the second sensor data are received at different times.] *a sampling time, associated with the second sensor data, matches a sampling time associated with the first sensor data, and wherein the first sensor data and the second sensor data are received at different times.*

22. The control device of claim [21] *20*, wherein [a] *the* read address of the first sensor matches a broadcast address associated with the first sensor and the second sensor.

23. The control device of claim [21] *20*, wherein [a] *the* read address of the second sensor is different from a broadcast address associated with the first sensor and the second sensor.

*24. A sensor, comprising:*

*one or more components to:*

*perform a measurement of a sensor signal at a point in time such that sensor data, corresponding to the measurement of the sensor signal at the point in time, is available;*

*receive a synchronization signal,*

*wherein the synchronization signal is formatted to include a start bit, information bits, and a stop bit; and*

*provide information based on the sensor data after receiving the synchronization signal,*

*wherein the information bits include a read/write bit.*

*25. The sensor of claim 24, wherein the information bits include a group of address bits that identify an address.*

*26. The sensor of claim 25, wherein the address is a broadcast address associated with a set of sensors.*

*27. The sensor of claim 25, wherein the address is associated with a particular sensor of a set of sensors.*

*28. The sensor of claim 24, wherein the information bits further include a set of cyclic redundancy check (CRC) bits.*

*29. The sensor of claim 24, wherein the information bits further include a group of address bits.*

*30. A system, comprising:*

*a sensor to:*

*determine, based on two or more synchronization signals provided by a control device, an expected time for receiving an upcoming synchronization signal; and*

*perform a measurement of a sensor signal at a point in time such that sensor data, corresponding to the measurement of the sensor signal at the point in time, is available at a selectable time interval based on the expected time for receiving the upcoming synchronization signal,*

*wherein a length of the selectable time interval is controlled based on a point in time at which the upcoming synchronization signal is received.*

*31. The system of claim 30, wherein the sensor is further to:*

*perform another measurement of the sensor signal based on a synchronization signal provided by the control device; and*

*calculate sensor data corresponding to the other measurement of the sensor signal.*

*32. The system of claim 30, wherein a length of the selectable time interval is less than or equal to a length of a synchronization period defined by the two or more synchronization signals.*

*33. The system of claim 30, wherein the sensor is further to:*

*receive the upcoming synchronization signal; and*

*transmit the sensor data, corresponding to the measurement of the sensor signal at the point in time, in response to receiving the upcoming synchronization signal.*

*34. The system of claim 30, wherein the sensor is a first sensor, the sensor signal is a first sensor signal, the sensor data is first sensor data, and the selectable time interval is a first selectable time interval,*

*wherein the system further comprises a second sensor to:*

*determine, based on the two or more synchronization signals provided by the control device, the expected time for receiving the upcoming synchronization signal; and*

*perform a measurement of a second sensor signal at the point in time such that sensor data, corresponding to the measurement of the second sensor signal at the point in time, is available at a second selectable time interval.*

*35. The system of claim 34, wherein the second sensor is further to:*

*perform another measurement of the second sensor signal based on a signal provided by the control device; and*

*calculate sensor data corresponding to the other measurement of the second sensor signal.*

*36. The system of claim 34, wherein a length of the second selectable time interval is less than or equal to a length of a synchronization period defined by the two or more synchronization signals.*

*37. The system of claim 34, wherein a length of the second selectable time interval is controlled based on a point in time at which the upcoming synchronization signal is received.*

*38. The system of claim 34, wherein a length of the second selectable time interval matches a length of the first selectable time interval.*

*39. The system of claim 34, wherein a read address of the first sensor matches a broadcast address associated with the first sensor and the second sensor.*

* * * * *